US009892732B1

(12) United States Patent
Tian et al.

(10) Patent No.: US 9,892,732 B1
(45) Date of Patent: Feb. 13, 2018

(54) LOCATION BASED VOICE RECOGNITION SYSTEM

(71) Applicant: PAYPAL, INC., San Jose, CA (US)

(72) Inventors: Cheng Tian, San Jose, CA (US); Srivathsan Narasimhan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/236,094

(22) Filed: Aug. 12, 2016

(51) Int. Cl.
*G10L 15/00* (2013.01)
*G10L 15/24* (2013.01)
*G10L 17/22* (2013.01)
*G10L 17/06* (2013.01)

(52) U.S. Cl.
CPC ............ *G10L 15/24* (2013.01); *G10L 15/00* (2013.01); *G10L 17/06* (2013.01); *G10L 17/22* (2013.01); *H05K 999/99* (2013.01)

(58) Field of Classification Search
CPC ....... G10L 15/22; G10L 15/30; G10L 15/265; G10L 15/02; G10L 15/00; G10L 15/08; G10L 15/10; G10L 15/12; G10L 15/1815; G10L 17/005; G10L 17/02; G10L 17/06; G10L 25/30; H05K 999/99
See application file for complete search history.

(56) References Cited

U.S. PATENT DOCUMENTS

| 9,251,792 B2 * | 2/2016 | Scheffer | G10L 17/22 |
| 9,571,930 B2 * | 2/2017 | Gupta | H04R 3/005 |
| 2015/0186892 A1 * | 7/2015 | Zhang | G06Q 20/40145 705/44 |

FOREIGN PATENT DOCUMENTS

WO    WO 2015070064    5/2015

* cited by examiner

*Primary Examiner* — Vu B Hang
(74) *Attorney, Agent, or Firm* — Haynes and Boone LLC

(57) ABSTRACT

Systems and methods for providing location based voice recognition include receiving, through a first microphone, an audio signal from a first user that includes an audio command requesting a service that requires user authorization before access to at least a portion of the service is granted. The user authorization is based on voice recognition (e.g., voice authentication and/or voice identification) of the audio signal. The source location of the audio signal is determined and a user location of the first user is determined. If the source location of the audio signal correlates with the user location, voice recognition on the audio signal may be performed. The first user may be authorized to access the service based on the voice recognition performed on the audio signal.

15 Claims, 13 Drawing Sheets

LOCATION BASED VOICE RECOGNITION SYSTEM

CROSS REFERENCE TO RELATED APPLICATIONS

This application is related to U.S. Utility application Ser. No. 15/230,120, filed Aug. 12, 2016, the disclosure of which is incorporated herein by reference in its entirety.

BACKGROUND

Field of the Disclosure

The present disclosure generally relates to user authorization based on voice recognition, and more particularly to correlating a source location of a user's voice with a user's physical location to perform user authorization based on voice recognition.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

When purchasing products and services with the assistance of a payment service provider, users are often required to complete a user authorization process presented by the payment service provider that verifies that the user requesting access to a user account serviced by the payment service provider is in fact the authorized user of that user account. Typically, users access their user account by physically inputting user credentials into user name and password fields of Internet based applications. However, more and more mobile devices and computing devices within public or private environments are configured with voice-control features such that users may control the device with voice commands spoken by the user. The prevalence of voice-controlled devices that function with little or no physical inputs by a user has enabled the ability for user authorization based on voice recognition (e.g., voice authentication, voice identification, etc.) algorithms using, for example, voice biometrics (e.g., a voice print) of users to authenticate and/or determine the identity of the user before access to the voice-controlled device and/or services provided by the voice-controlled device are enabled.

In some systems, voice-controlled devices may access third party services such as payment service provider services that provide a user the ability to access account information or complete purchases by providing voice commands to the voice-controlled devices. Voice recognition algorithms may be performed before requested services are provided to the user by the voice-controlled device and/or the payment service provider. For example, the user may provide a voice based authentication phrase to access the user account provided by the payment service provider, and the voice recognition algorithm processes the voice based authentication phrase to determine whether to provide the user access to the requested service. However, a voice based authentication phrase may be easily spoofed by providing a recorded or synthesized input of the voice based authentication phrase by someone who is not the actual user of the user account.

Another problem with voice-controlled devices is that in environments with multiple users, the voice-controlled device may have trouble distinguishing which user is providing a voice command, separating multiple audio signals received from different users, and associating a first audio signal provided by a user with a second audio signal provided by the same user at a later time, particularly if that user moves about the environment.

Thus, there is a need for an improved voice control system.

Figure 1:
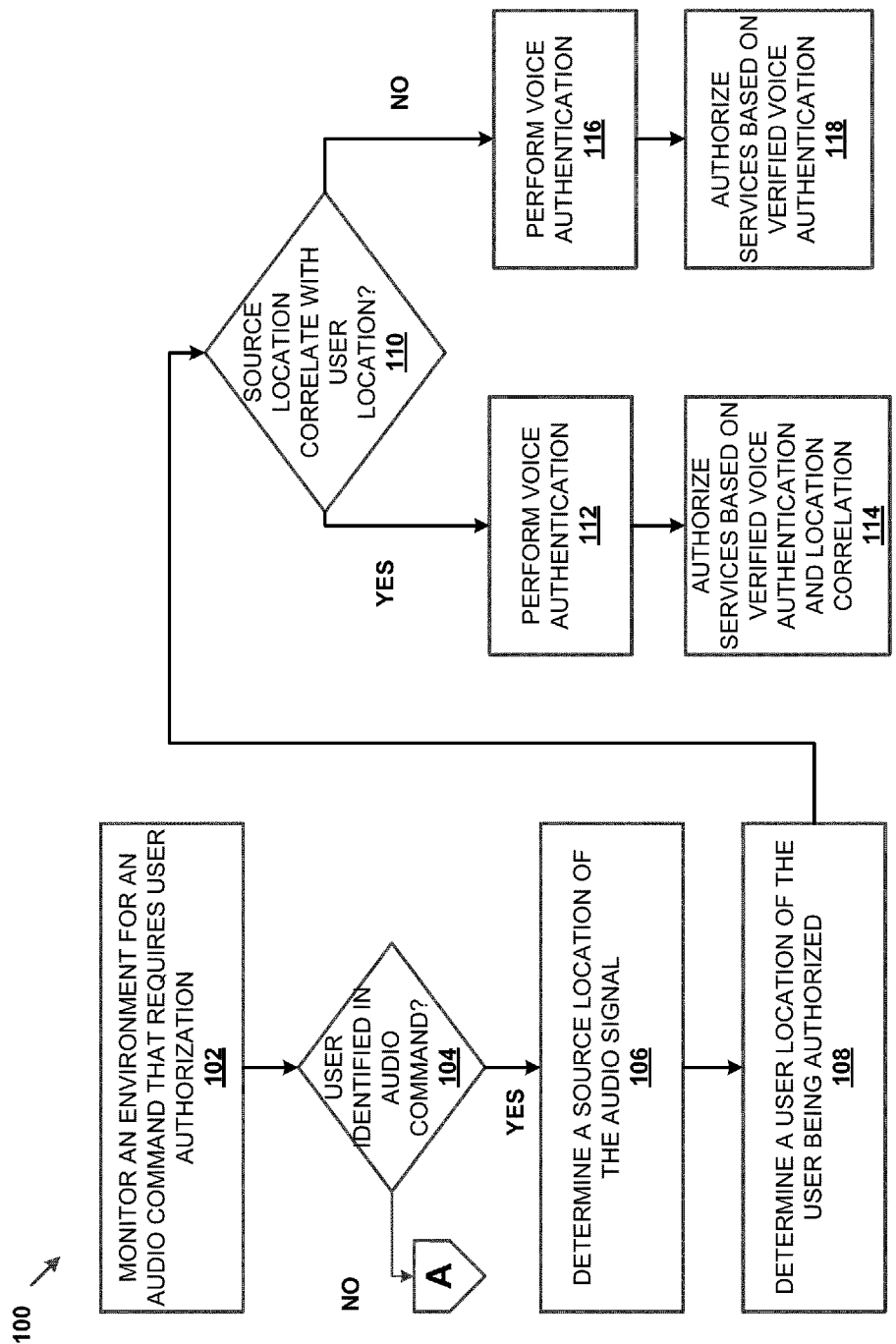
FIG. 1 is a flow chart illustrating an embodiment of a method for location based voice recognition.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a location based voice recognition system. The location based voice recognition system includes one or more voice-controlled devices that are configured to capture audio signals from an environment surrounding the one or more voice-controlled devices via a microphone system, and convert the captured audio signals into electrical signals that are processed by the voice-controlled devices. The captured audio signals may include audio commands that the voice-controlled device is configured to process to perform various tasks such as providing music, news, weather, traffic reports, audiobooks, and/or other audio content through an audio generation system, completing online purchases, performing home automation services, and/or providing any of the other service discussed below. Such processing may include detecting audio commands from a user within an audio signal generated in response to user speech, and processing those audio commands using speech recognition techniques to cause those audio commands to be executed. To execute certain audio commands by a voice-controlled device and/or service provider device in communication with the voice-controlled device over a network, user authorization may be required. Some voice-controlled devices used in the system may have very limited physical input capabilities, and voice recognition (e.g., voice authentication and/or voice identification) using voice-biometrics (e.g., analyzing a voice print) may be used to enable the user authorization. However, as discussed above, voice prints may be easily reproduced by unauthorized users of another user's account by providing a recording of the user's voice and/or providing a synthesized input of a voice based authentication phrase by someone other than the actual user of the account.

The present disclosure provides an improved voice recognition system that includes one or more voice-controlled devices that capture audio signals from an environment surrounding the voice recognition system. The audio signals may include an audio command from a user that is located within audio range of the voice-controlled device. The audio command, when processed by the voice-controlled device, may cause an action, service, response, and/or the like to be performed that requires user authorization. User authorization may be completed with a voice authentication process that verifies a user's identity based on the user's voice. To further verify that the audio command is in fact being provided by the actual authorized user, the voice-controlled device may use location correlation to further authenticate the user providing the audio signal. In determining location correlation, the voice-controlled device may determine a source location of the audio signal that includes the audio command, as well as a user location of the user identified by the audio signal/command. If the user location and the source location correlate to substantially the same location (e.g., within a predetermine distance from each other), the voice-controlled device may proceed with the voice authentication and authorize the service being requested in the audio command. If the user location does not correlate with the source location and/or the user location is indeterminable, the voice-controlled device may end the user authorization process, or may authorize services associated with the audio command that are dependent on voice authentication alone (which may be provided with fewer features than if the source location and the user location were correlated). In various embodiments, the voice-controlled device may be in communication with a service provider device through a network such that the service provider device is configured to perform some or all of the location correlation, voice authentication, and services provisioning requested by the audio command with the assistance of one or more voice-controlled devices.

In another embodiment, the location based voice recognition system may provide user identification services when performing user authorization. The voice-controlled device may receive an audio signal that includes an audio command requiring user authorization before services associated with the audio command are performed by the voice-controlled device and/or a service provider device. Such user authorization may be based on voice identification of a particular unknown user based on that particular unknown user's voice. The unknown user's voice captured by a voice-controlled device may be compared to a plurality of voice prints that are each associated with a respective user, and when the unknown user's voice matches one of the plurality of voice prints, the respective user associated with the matched voice print may be determined to be the unknown user. However, voice identification in a voice-controlled device environment runs into some of the same issues as the voice authentication discussed above (i.e., a user's voice may be spoofed with a recording and/or synthesized voice). Therefore, the voice-controlled device may compare the identity of the user determined from the audio signal to an identity of a user that is physically located at the source location of the audio signal to verify that the audio signal is not being impersonated before user authorization is completed.

Furthermore, the present disclosure provides an improved voice association system. When multiple users are within an environment surrounding a voice-controlled device, the voice-controlled device may have trouble distinguishing which user is providing a particular audio command, separating multiple audio signals received from different users at the same time, and associating a first audio signal provided by a user with a second audio signal provided by the same user at a later time. These issues becomes even more troublesome when the users are moving around the environment or in close proximity to each other, as resulting associations between what is being said in the environment based on a source location of the audio signal may be incorrect.

The voice association system of the present disclosure includes a voice-controlled device that may determine the source location of one or more audio signals in its environment that includes multiple users. The voice-controlled device may then determine a user location for each user within the environment. If a user location correlates with the source location, as well as with a user identity determined from the audio signal, then the voice-controlled device may associate a particular signal with a particular user within its environment. When source location and/or voice comparison between audio signals are indeterminable, user location and user identity (based on user location) may be used by the voice-controlled device to distinguish the audio signals and associate them with distinct processes associated with each user in the environment.

Referring now to FIGS. 1, 2, 3, 4, 5, and 6, a method 100 for location based voice recognition is illustrated. In some embodiments of the method 100, one or more service provider devices and/or one or more voice-controlled devices may operate to perform or enable the method 100. For example, a distributed group of devices may operate to maintain a location based voice recognition system by storing identifiers of users of the location based voice recognition system, identifying audio commands that require user authorization, determining source locations of audio commands, determining user locations of users in an environment surrounding a voice-controlled device, correlating the user location with the source location, performing voice recognition, and/or performing the other actions discussed below. In a specific example, a service provider such as, for example, PayPal, Inc. of San Jose, Calif., may provide a service provider device to perform the method 100 discussed below, and in some embodiments may operate in cooperation with one or more other system providers (via their system provider devices) and users (via their voice-controlled devices and other user devices). However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Figure 2:
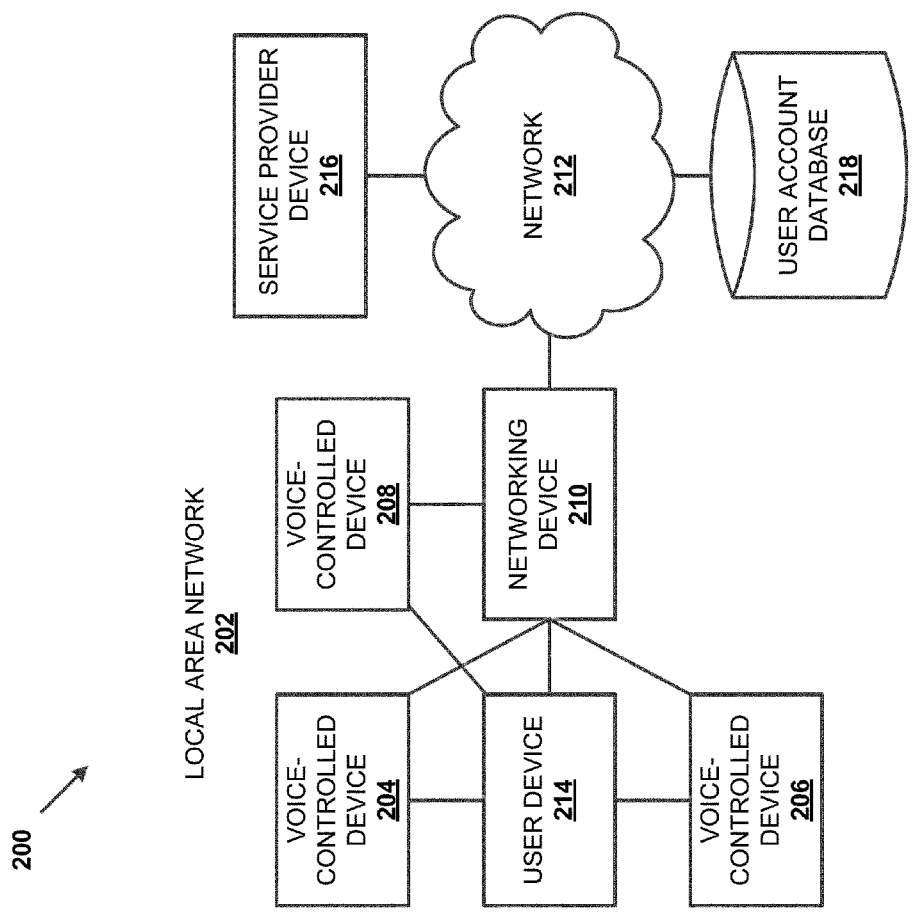
FIG. 2 is a schematic view illustrating an embodiment of a location based voice recognition system.

Referring now to FIG. 2, an embodiment of a voice recognition system 200 is illustrated and described briefly for reference in the method 100 discussed below. In an embodiment, the voice recognition system 200 may include a local area network (LAN) 202. The LAN 202 may include a voice-controlled device such as a voice-controlled device 204. However, the first LAN 202 may include any number of voice-controlled devices (e.g., a voice-controlled device 206 and a voice-controlled device 208) each coupled together through the LAN 202. The LAN 202 may also include a networking device 210 configured to provide communications between the voice-controlled devices 204, 206, and 208 and with a network 212 (e.g., a wide area network (WAN)). In an embodiment, the networking device 210 may be a wireless access point that provides wireless communications between devices of the LAN 202 via wireless communication technologies such as Wi-Fi, Bluetooth, or any wireless standard known in the art. The networking device 210 may be configured with one or more service set identifiers (SSID) to function as a local network for any particular user or set of users.

The LAN 202 may also include one or more user devices (e.g., a user device 214), which may be configured to communicate with the voice-controlled device 204 directly and/or via the networking device 210. The devices in the LAN 202 (e.g., the voice-controlled devices 204, 206, and 208 and the user device 214) may be coupled through the network 212 with a service provider system that includes a service provider device 216 and a user account database 218 that is illustrated as being separate from the service provider device 216. However, one skilled in the art will recognize that the service provider device 216 may include the user account database 218. While a specific example of the location based voice recognition system 200 is illustrated, one of skill in the art in possession of the present disclosure will recognize that a wide variety of voice recognition systems having various configurations of networks and voice-controlled devices may operate to provide the systems and methods discussed herein without departing from the scope of the present disclosure.

Figure 3:
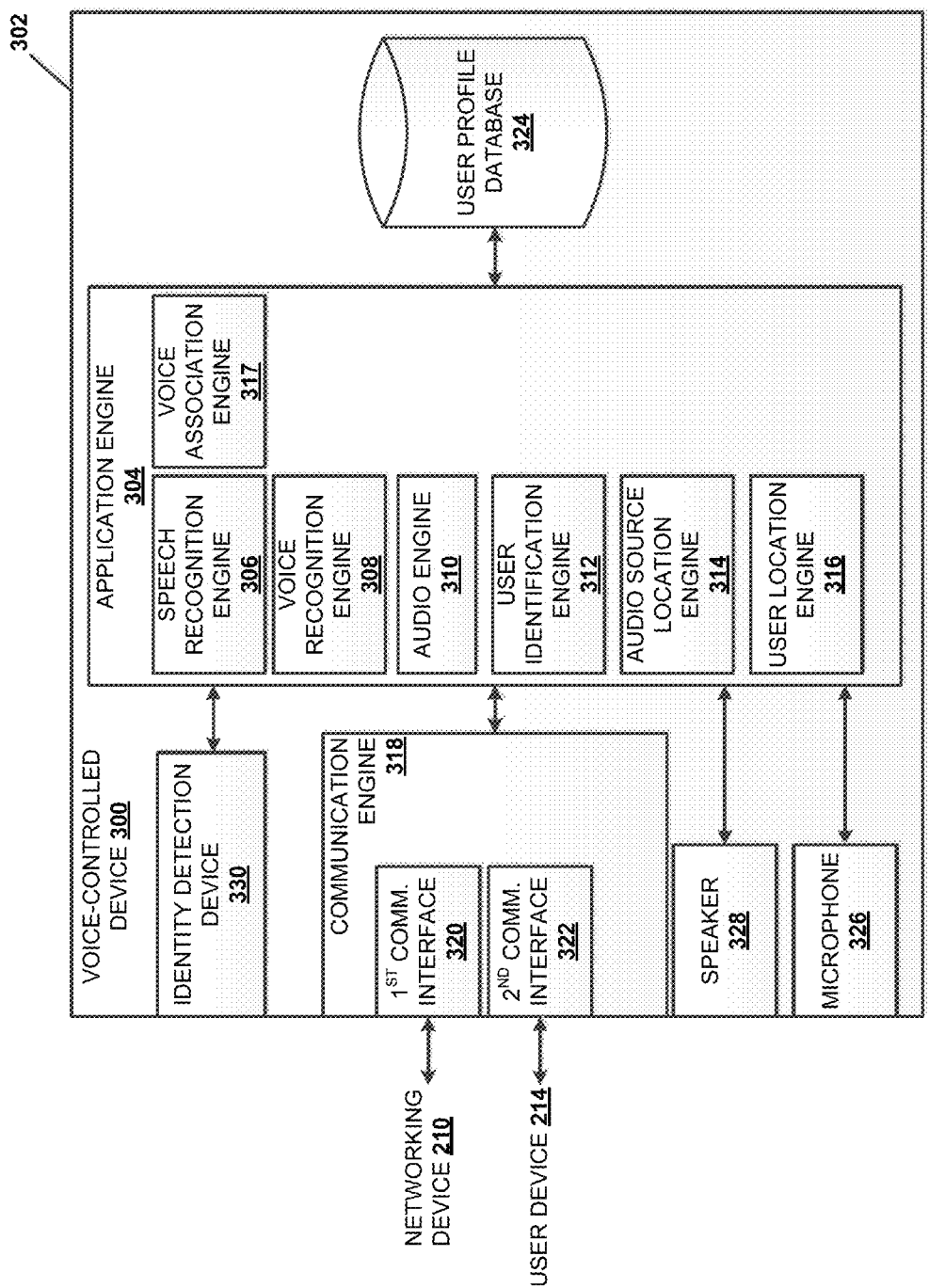
FIG. 3 is a schematic view illustrating an embodiment of a voice-controlled device used in the location based voice recognition system of FIG. 2.

Referring now to FIG. 3, an embodiment of a voice-controlled device 300 is illustrated that may be any or all of the voice-controlled devices 204, 206, and 208 discussed above with reference to FIG. 2, and which may be provided by a voice-enabled wireless speaker system, a home appliance, a desktop computing system, a laptop/notebook computing system, a tablet computing system, a mobile phone, a set-top box, a vehicle audio system, a remote control, a wearable device, and implantable device, and/or other voice-controlled devices known in the art. In the illustrated embodiment, the voice-controlled device 300 includes a chassis 302 that houses the components of the voice-controlled device 300, only some of which are illustrated in FIG. 3. For example, the chassis 302 may house a processing system (not illustrated) and a non-transitory memory system (not illustrated) that includes instructions that, when executed by the processing system, cause the processing system to provide an application engine 304 that is configured to perform the functions of the application engines and/or the voice-controlled devices 300 discussed below. In the specific example illustrated in FIG. 3, the application engine 304 is configured to provide a speech recognition engine 306, a voice recognition engine 308, an audio engine 310, a user identification engine 312, an audio source location engine 314, a user location engine 316, and a voice association engine 317 that perform the functionality discussed below, although one of skill in the art in possession of the present disclosure will recognize that other applications and computing device functionality may be enabled by the application engine 304 as well.

The chassis 302 may further house a communication engine 318 that is coupled to the application engine 304 (e.g., via a coupling between the communication engine 318 and the processing system). The communication engine 318 may include software or instructions that are stored on a computer-readable medium and that allow the voice-controlled device 300 to send and receive information over the networks discussed above. For example, the communication engine 318 may include a first communication interface 320 to provide for communications through the networking device 210 to networks 202 and 212 as detailed below. In an embodiment, the first communication interface 320 may be a wireless antenna that is configured to provide communications with IEEE 802.11 protocols (Wi-Fi). In other examples, the first communication interface 320 may provide wired communications (e.g., Ethernet protocol) from the voice-controlled device 300 and through the networking device 210 to networks 202 and 212. The communication engine 318 may also include a second communication interface 322 that is configured to provide direct communication with a user device 214 and/or other voice-controlled devices. For example, the second communication interface 322 may be configured to operate according to wireless protocols such as Bluetooth®, Bluetooth® Low Energy (BLE), near field communication (NFC), infrared data association (IrDA), ANT, Zigbee, and other wireless communication protocols that allow for direct communication between devices.

The chassis 302 may also house a user profile database 324 that is coupled to the application engine 304 through the processing system. The user profile database 324 may store user profiles that include user identification information, user preferences, user device identifiers, user voice prints, other user identifiers, and/or other information used by the application engine 304 for voice authentication, voice identification, user identification, determining a source location of an audio signal, determining a user location, and/or to perform any of the other functionality discussed below. While the user profile database 324 has been illustrated as housed in the chassis 302 of the voice-controlled device 300, one of skill in the art will recognize that it may be connected to the application engine 304 through the networking device 210 without departing from the scope of the present disclosure.

The chassis 302 may also house a microphone 326, a speaker 328, and in some embodiments, an identity detection device 330. For example, the microphone 326 may include an array of microphones that are configured to capture audio signal from an environment surrounding the voice-controlled device 300, and generate electrical signals from the captured audio signals to be processed by the speech recognition engine 306. The array of microphones may be used to determine a direction of a user speaking to the voice-controlled device 300. Similarly, the speaker 328 may include an array of speakers that are configured to receive audio signals from the audio engine 310, and output sound to the environment surrounding the voice-controlled device 300. In a specific example, the array of speakers may be used to output sound in the direction of the user speaking to the voice-controlled device 300. The identity detection device 330 may be a camera, a motion sensor, a thermal sensor, a fingerprint scanner, and/or any other device that may be used to gather information from the environment surrounding the voice-controlled device 300 for use in identifying a user. The identity detection device 330 may be used by the user identification engine 312 and user location engine 314 to identify users and determine positions of users in relation to the voice-controlled device 300. While a specific example of the voice-controlled device 300 is illustrated, one of skill in the art in possession of the present disclosure will recognize that a wide variety of voice-controlled devices having various configurations of components may operate to provide the systems and methods discussed herein without departing from the scope of the present disclosure.

Figure 4:
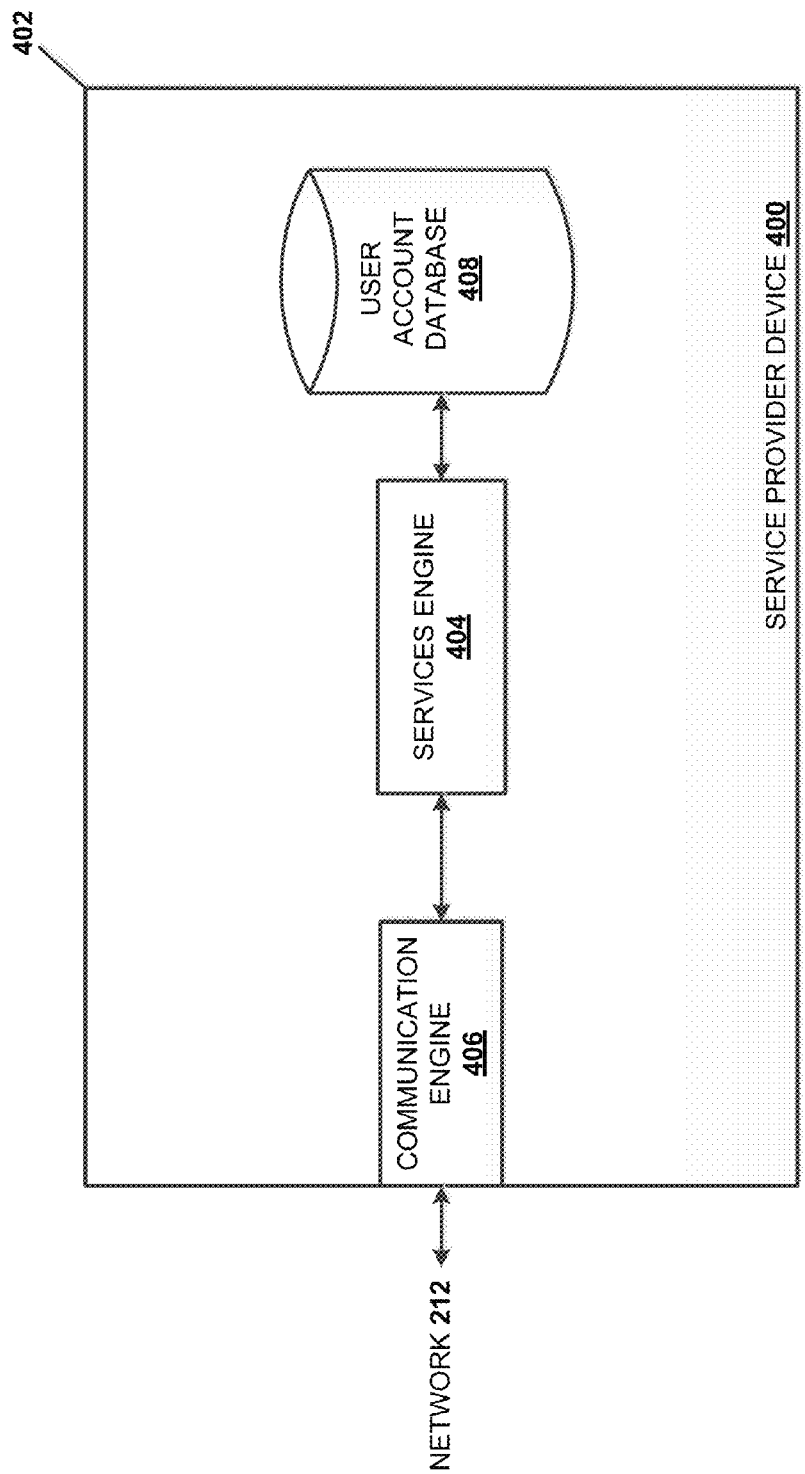
FIG. 4 is a schematic view illustrating an embodiment of a service provider device used in the location based voice recognition system of FIG. 2.

Referring now to FIG. 4, an embodiment of a service provider device 400 is illustrated. In an embodiment, the service provider device 400 may be the service provider device 216 discussed above with reference to FIG. 2. In a specific example, the service provider device 400 may belong to an on-line or mobile payment service provider such as, for example, PayPal, Inc. of San Jose, Calif. In the illustrated embodiment, the service provider device 400 includes a chassis 402 that houses the components of the service provider device 400, only some of which are illustrated in FIG. 4. For example, the chassis 402 may house a processing system (not illustrated) and a non-transitory memory system (not illustrated) that includes instructions that, when executed by the processing system, cause the processing system to provide a services engine 404 that is configured to perform the functions of the services engines and/or service provider devices discussed below. In a specific example, the services engine 404 may be configured to perform the services provided by a service provider, to perform user authorization for the services based on voice recognition (e.g., voice authentication and voice identification), correlate user locations with source locations of audio signals, and provide any of the other functionality that is discussed below.

The chassis 402 may further house a communication engine 406 that is coupled to the services engine 404 (e.g., via a coupling between the communication system 406 and the processing system) and that is configured to provide for communication through the network as detailed below. The communication engine 406 may allow the service provider device 400 to send and receive information over the network 212. The chassis 402 may also house a user account database 408 that is coupled to the services engine 404 through the processing system. The user account database 408 may store user profiles, user identifiers, user permissions, user voice prints, tracking data of users in proximity of a voice-controlled device, and/or other data used by the services engine 404 to provide services and perform user authorization for the services via voice recognition. While the user account database 408 has been illustrated as housed in the chassis 402 of the service provider device 400, one of skill in the art will recognize that the user account database 408 may be the user account database 218 of FIG. 2 and connected to the services engine 404 through the network 212 without departing from the scope of the present disclosure.

Referring back to FIG. 1, the method 100 of location based voice recognition begins at block 102 where a voice-controlled device monitors an environment for an audio signal that is provided by a user and that includes an audio command that requires user authorization before a service associated with the audio command is provided. In an embodiment, the voice-controlled device may be the voice-controlled device 300, and at block 102 the voice-controlled device 300 may monitor the environment for audio signals. For instance, the microphone 326 of the voice-controlled device 300 may capture an audio signal from the environment, the microphone 326 may generate electrical signals based on that audio signal, and those electrical signals may then be provided to the speech recognition engine 306. The speech recognition engine 306 is configured to determine what a user is saying by, in some examples, recognizing and translating spoken language into text or other data that may be processed by a computer processor. The speech recognition engine 306 may then analyze the electrical signals and further identify a user that is providing an audio command to the voice-controlled device 300. The voice-controlled device 300 may process the audio command, which may trigger a request for user authorization depending on the service being requested by the audio command. For example, the voice-controlled device 300 may be configured to provide a first set of services for a first user, a second set of services for a second user, a third set of services for a group of users, and a fourth set of services that are available publically to any requesting user.

In another embodiment, the audio command may be a request for services from a service provider over a network (e.g., network 212). For example, the voice-controlled device 300 may receive an audio command that is requesting services provided by a service provider of the service provider device 400, and the voice-controlled device 300 may provide a request for services based on the audio command to the service provider device 400. The service provider device 400 may then determine that the request requires user authorization before the service provider device 400 can provide the services being requested, and provide a user authorization request to the voice-controlled device 300.

Figure 5:
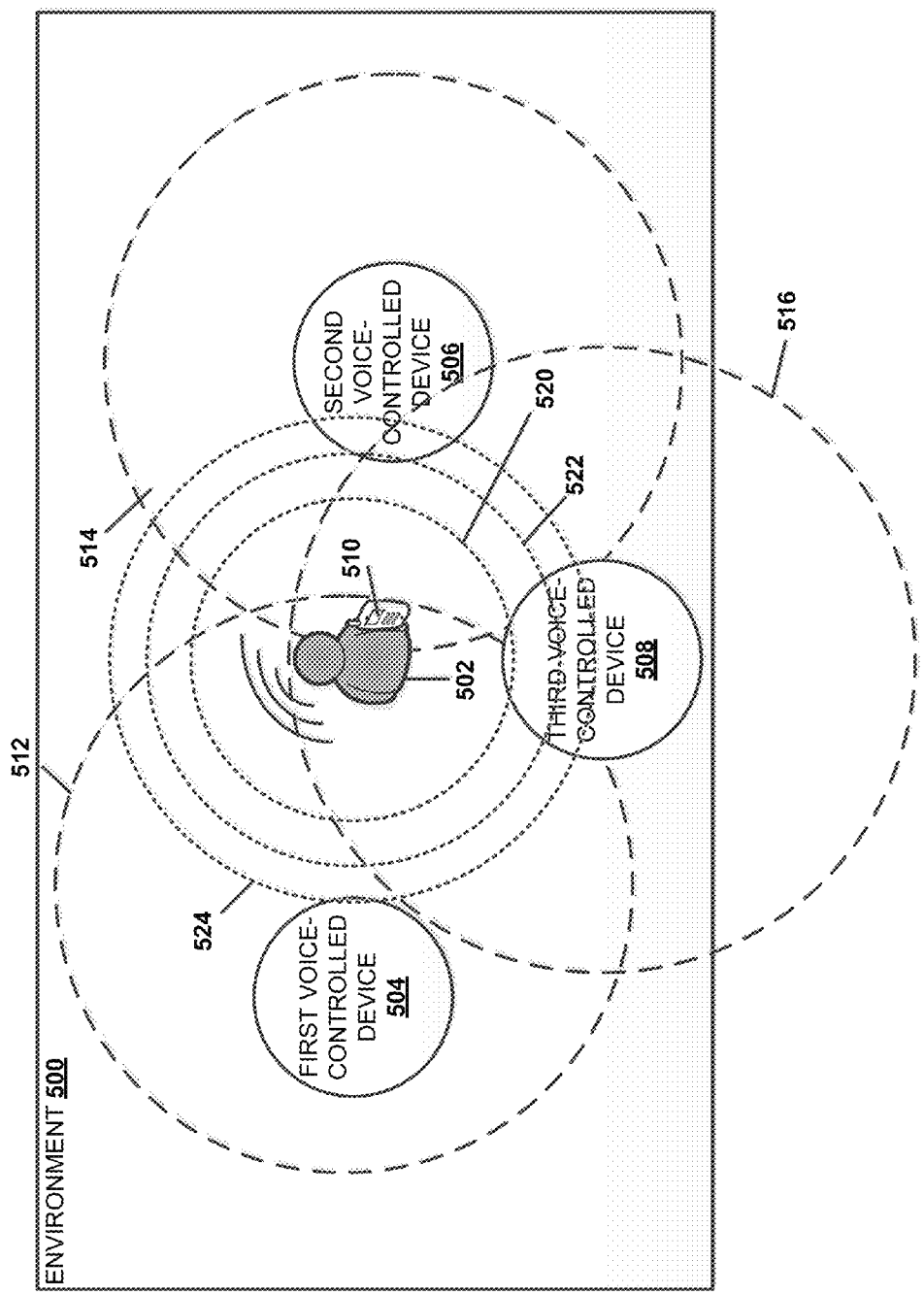
FIG. 5 is a block diagram illustrating an embodiment of a use of the location based voice recognition system of FIG. 2.
Figure 6:
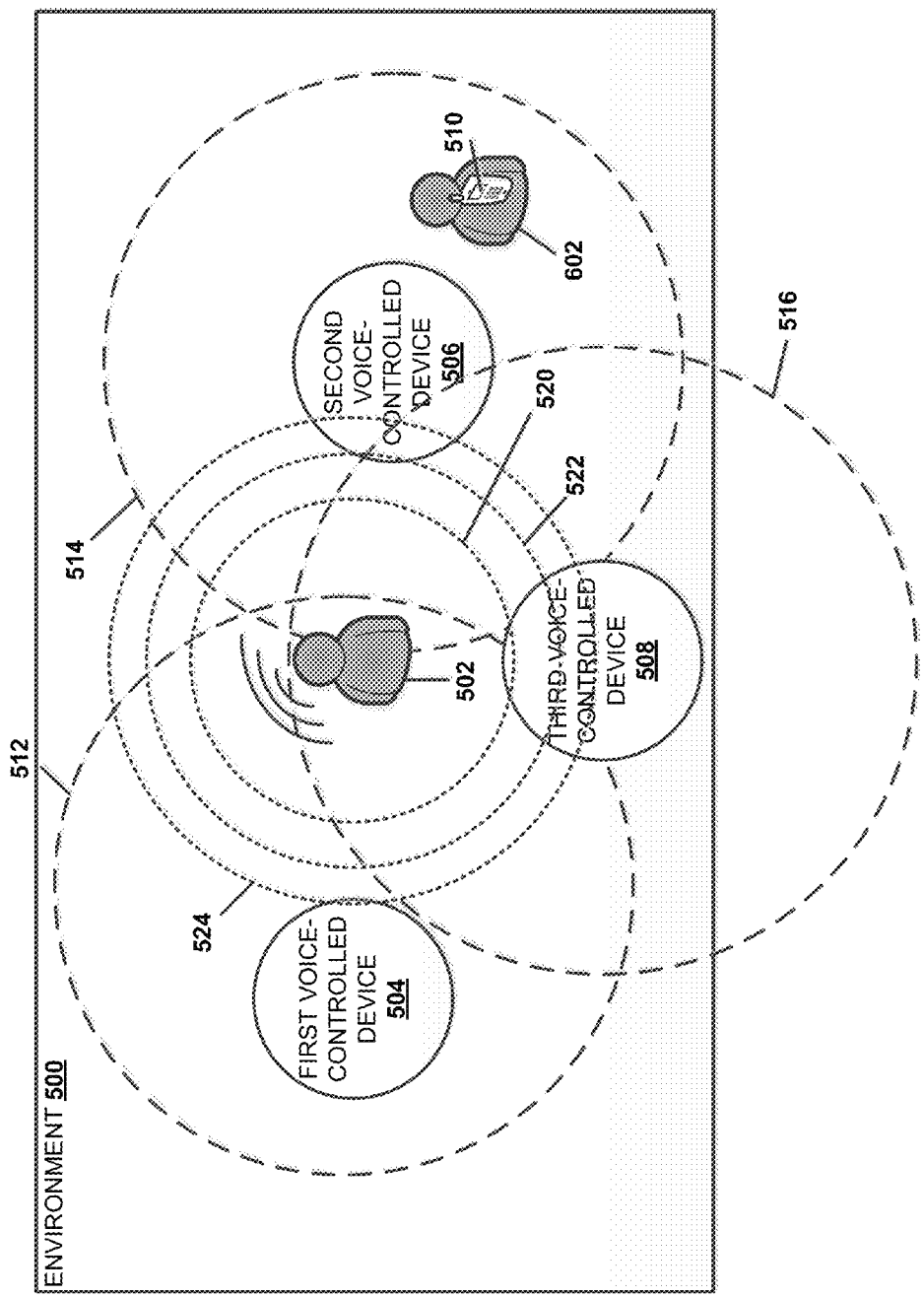
FIG. 6 is a block diagram illustrating an embodiment of a use of the location based voice recognition system of FIG. 2.

Referring now to FIGS. 5 and 6, block diagrams of specific examples of the performance of the method 100 are illustrated. Referring first to FIG. 5, an environment 500 may include a first user 502, as well as a first voice-controlled device 504 and optionally a second voice-controlled device 506 and a third voice-controlled device 508. The voice-controlled devices 504, 506, and 508 may be coupled together by a networking device (e.g., the networking device 210 of FIG. 2) providing a local area network (LAN) and/or the voice-controlled device 504, 506, and 508 may be coupled to each other through peer-to-peer wireless connections. The networking device may provide a first wireless signal (e.g., Wi-Fi signal) (not illustrated) that generally provides a wireless local area network (WLAN) for the location 500, and any of the first voice-controlled device 504, the second voice-controlled device 506, the third voice-controlled device 508 and any user devices (e.g., a user device 514) may connect to the WLAN using techniques known in the art. The first voice-controlled device 504 may also provide a first wireless signal 512 via a wireless protocol such as Bluetooth®, BLE, NFC, IrDA, ANT, Zigbee, and other wireless protocols used for direct communication known in the art. The second voice-controlled device 506 may provide a second wireless signal 514 and the third voice-controlled device 508 may provide a third wireless signal 516 similar to any of those available to the first voice-controlled device 506. The first wireless signal 512, the second wireless signal 514, and the third wireless signal 516 may allow for direct communication between the first voice-controlled device 504, the second voice-controlled device 506, the third voice-controlled device 508, and the user device 510.

At block 102 of method 100, the first voice-controlled device 504 and, optionally, the second voice-controlled device 506 and the third voice-controlled device 508, may monitor the environment 500 for audio signals provided by the user 502. In response to determining that the user 502 has provided an audio signal, the voice-controlled device 504 may determine whether the audio signal includes an audio command requiring user authorization before the first voice-controlled device 504 and/or a service provider in communication with the first voice-controlled device 504 provides a service to the user.

More specifically, the user may speak a predefined word or words, may make a predefined sound, or provide some other audible noise that, when recognized by the speech recognition engine 306, indicates to the speech recognition engine 306 that the user is going to provide an audio command to the voice-controlled device 300, followed by an audio command. The speech recognition engine 306 may determine that the audio command includes an instruction for the voice-controlled device 300 and/or service provider device 400 to perform a service. The voice-controlled device 300 and/or a service provider device 400 may require user authorization before the service is provided to the user. For example, the user 502 may request that the first voice-controlled device 504 pay for an on-line purchase using an account provided by the service provider device 400 (e.g., a payment service provider device). The first voice-controlled device 504 may process the audio command and send a request to the service provider device 400 to complete the purchase. The payment service provider may require user authorization before the service provider device 400 will perform the service.

Referring now to FIG. 6, an example of the environment 500 is illustrated that includes the first user 502, a second user 602, the first voice-controlled device 504 providing the first wireless signal 512, the second voice-controlled device 506 providing the second wireless signal 514, the third voice-controlled device 508 providing the third wireless signal 516, and the user device 510. Similar to the example illustrated in FIG. 5, at block 102 of method 100 the first user 502 may provide an audio signal that includes an audio command that requires user authorization before a service requested in the audio command is performed.

The method 100 then proceeds to block 104 where a determination is made as to whether the audio command includes an identity of a user. In an embodiment of block 104, the voice-controlled device 300 may determine whether the audio command includes an identity of a user. For example, the audio command may include a user name, an account number, a phone number, an email address, a first name and/or a last name, and/or any other identifier associated with a user known to one of skill in the art. Determining whether the audio command includes an identity of a user indicates to the location based voice recognition system 200 whether voice authentication is necessary to verify the user providing the audio command, or whether voice identification is necessary to identify the user based on the voice print of the audio command. If the audio command does not include an identifier of a particular user, the method 100 may continue with voice identification described in method 700 in FIG. 7, discussed below.

A specific example is provided in FIGS. 5 and 6. The user 502 may provide an audio command such as "Pay for items with UserA's account with Payment Service ProviderA" to, for example, perform a purchase with the voice-controlled device 300. UserA may be the identifier of the particular user in the audio command, and Payment Service ProviderA may require voice authentication before the audio command is executed. In another example, the user 502 may provide an audio command such as "Pay for items with Payment Service ProviderA", and Payment Service ProviderA may require user authorization before completing the audio command, but has not been given the user account to use in the transaction. In such a situation, user identification is required that may include performing voice identification based on the voice print of the audio command as described further below.

If a user is identified with the audio command, then the method 100 proceeds to block 106 to begin the process of location based voice authentication to verify the claimed identity of the user providing the audio command. At block 106, a source location of the audio command is determined. In an embodiment of block 106, the audio source location engine 314 of the voice-controlled device 300 may determine the source location of the audio command. The source location may include, for example, an actual location of the audio command relative to the voice-controlled device 300, a distance between the source of the audio command and the voice-controlled device 300, a direction of the source of the audio command relative to the voice-controlled device 300, and/or any other measure of the audio command. The audio source location engine 314 of the voice-controlled device 300 may determine the source location of the audio command according to any acoustic localization technique known in the art that can be performed by one or more voice-controlled devices 300. For example, the voice-controlled device 300 may include a plurality of microphones 326 that each generates an electrical signal based on an audio signal that includes the audio command, and the audio source location engine 314 may utilize time-difference-of-arrival (TDOA) techniques to determine a distance between the source location of the audio command and voice-controlled device 300. The audio source location engine 314 may then cross-correlate the times at which different microphones 326 received the audio command to determine the source location of the audio command.

Similarly, the voice-controlled device 300 may be the voice-controlled device 204 of FIG. 2, which may be in communication with the voice-controlled device 206 and/or the voice-controlled device 208. The voice-controlled devices 204, 206, and 208 may each include one or more microphones 326 that are positioned about an environment to receive audio signals from users. Each voice-controlled device 204, 206, and 208 may be synchronized such that when an audio signal is received by each voice-controlled device 204, 206, and 208, each voice-controlled device 204, 206, and 208 creates a time stamp that includes the time at which each voice-controlled device 204, 206, and 208 received the audio signal. The voice-controlled devices 204, 206, and 208 may communicate their respective time stamps to each other and/or to the service provider device 400 or some other centralized device. The first voice-controlled device 204 may then use known positions of the voice-controlled devices 204, 206, and 208 along with the time stamps that indicate when each voice-controlled device 204, 206, and 208 received the audio command to determine the source location of the audio signal based on TDOA and triangulation techniques.

In yet another example, the audio source location engine 314 may be configured with one or more machine learning algorithms to perform supervised machine learning, unsupervised machine learning, semi-supervised learning, reinforcement learning, deep learning, and other machine learning algorithms known to one of skill in the art in possession of the present disclosure in determining a source location of a user within an environment. In one example, the audio source location engine may include a supervised machine learning algorithm to calibrate the audio source location engine 314 for a particular environment. The environment where the voice-controlled device 300 is located may have unique acoustic properties. When the voice-controlled device 300 is initiated for the first time, users may be instructed to undergo an initial calibration routine of the voice-controlled device 300. For example, the voice-controlled device 300 may prompt the user to issue a certain set of audio commands at a predetermined location in the environment. The audio command may have unique characteristics that are based on the predetermined location and the environment in which the user is providing the audio commands. The voice-controlled device 300 may generate an acoustic signature based on the audio command provided by the user that is particular to the unique characteristics of the predetermined location. The audio source location engine 314 may compare the acoustic signatures generated during the calibration to subsequent acoustic signatures associated with subsequent audio commands to determine a source location of those subsequent audio commands.

Similarly, the audio source location engine 314 may be configured with unsupervised machine learning algorithms such that the audio source location engine 314 may generate and update acoustic signatures while the voice-controlled device 300 is in operation. For example, some audio commands may be associated with a source location with a high certainty whereas other audio commands may be associated with a source location with low certainty. If the audio command is associated with a source location with a high certainty (e.g., user's audio command is picked up by multiple microphones, the audio signal has very little noise, and other), then that audio command's acoustic signature may be added to a training set of acoustic signatures. The audio source location engine 314 may use the training set in determining a source location of that user and other users providing subsequent audio commands within the environment. While specific examples of acoustic source localization have been described, one of skill in the art in possession of the present disclosure will recognize that the voice-controlled device 300 may determine the source location of the audio signal using other acoustic localization methods without departing from the scope of the present disclosure.

Referring to the specific example illustrated in FIG. 5, the user 502 provides an audio signal in the environment 500. The third voice-controlled device 508 receives the audio signal at a first time 520, the second voice-controlled device 506 receives the audio signal at a second time 522, and the first voice-controlled device 504 receives the audio signal at a third time 524. Each of the first voice-controlled device 504, the second voice-controlled device 506, and the third voice-controlled device 508 may provide respective audio signal time of arrivals to each other. In another example, the first voice-controlled device 504 may be a primary voice-controlled device while the second voice-controlled device 506 and the third voice-controlled device 508 may be secondary voice-controlled devices that provide back-up or redundancy to the system and provide any information gathered from the environment 500 to the primary voice-controlled device 504. Based on the first time 520, the second time 522, and/or the third time 524, the first voice-controlled device 504 may use any acoustic source localization technique or combination of techniques to determine the source location of the audio signal. In the specific example where the user 502 provided the audio command "Pay for items with UserA's account with Payment Service ProviderA," at least one of voice-controlled devices 504, 506, and 508 may determine the source location of the audio command.

The method 100 then proceeds to block 108 where a user location of the user being authenticated is determined. In an embodiment of block 108, the voice-controlled device 300 may determine the user location of the user identified by the audio command that requires user authorization. The user location may include, for example, an actual location of the user needing authentication relative to the voice-controlled device 300, a distance between the user of the audio command and the voice-controlled device 300, and/or a direction of the use of the audio command relative to the voice-controlled device 300. The user location engine 316 of the voice-controlled device 300 may determine the user location of the audio signal according to any user localization technique known in the art that may be performed by one or more voice-controlled devices 300.

For example, the user location engine 316 may receive signal strengths of one or more wireless protocols of a user device (e.g., the user device 214 of FIG. 2) that includes a user device identifier that is associated with the user identified in the audio command at the communication engine 318. For example, the user device 214 may communicate with one or more networking devices 210 via Wi-Fi, and the one or more networking devices 210 may each be configured to communicate a signal strength and a user device identifier of the user device 214 to the communication engine 318 via the first communication interface 320. The user device may be mobile phone, a wearable device, a tablet computing system, a laptop/notebook computing system, an implantable device, and any other user device that has a high probability of only being associated with a particular user or users. The user device identifier may be a token, character, string, or any identifier for differentiating a user device from another user device. For example, the user device identifier may be an internet protocol address, a network address, a media access control (MAC) address, a universally unique identifier (UUID), a phone number, and/or any other identifier that may be transmitted from a user device to the voice-controlled device 300.

Alternatively or in addition to the Wi-Fi signal, the second communication interface 322 of the voice-controlled device 300 may be in direct communication with the user device 214 with a direct communication protocol such as BLE. The communication engine 318 may be configured to determine signal strength of the direct communication protocol as well as provide a user device identifier associated with the user device communicating with the second communication interface 322. The voice-controlled device 300 may also receive signal strength information and user device identifier information from other voice-controlled devices 300 that are included in a network. The user location engine 316 may determine the location of the user device 214 providing the wireless signals by any wireless signal localization techniques, such as Wi-Fi based positioning, Bluetooth® proximity based detection, angle of arrival techniques, time of arrival techniques, received signal strength indication (RSSI) measurements and other wireless signal localization. In other embodiments, the user device 214 may be configured to provide GPS information associated with the user device 214 to the voice-controlled device 300.

The user location engine 316 in conjunction with the user identification engine 312 may determine that the user device identifier associated with the received audio signal is a user device identifier of a user device that is associated with a user profile in the user profile database 324. In some examples, the user profile may belong to the user identified as requiring user authorization in the audio command. In other examples, the user identifier may not match with any user identifiers associated with a stored user profile. In yet other examples, the user identifier may match a user profile associated with a user other than the user identified as requiring user authorization. As such, when a user device comes into proximity of a low energy protocol wireless signal provided by the second communication interface 318, a user device identifier associated with the user device may be communicated to the second communication interface 318. Note that "proximity" may be defined herein as being within a predetermined distance between two devices or within a communication range of the devices. The user identification engine 310 may then compare the received user device identifier to user device identifiers that are stored in the user profile database 320 in association with user profiles. If the user device identifier of a user device matches a stored user device identifier associated with a user profile, then the user identification engine 310 may determine there is a high probability that the user of the user device is the user identified in that user profile. In some embodiments, the user identification engine 310 may use a combination of identification techniques described above to obtain a threshold confidence level to determine that the user providing the audio signal is a user associated with a stored user profile. While specific embodiments to determine the identity of the user have been described, one of skill in the art in possession of the present disclosure will recognize that the first voice-controlled device 300 may determine the identity of the first user using other identifying methods without departing from the scope of the present disclosure.

In another example, the identity detection device 330 of the voice-controlled device 300 may include a camera that is configured to capture images of the environment, and the user location engine 316 may analyze these images to identify a location of one or more users within the environment, distances of users in the environment from the voice-controlled device 300, and/or directions of users relative to the voice-controlled device 300. The user identification engine 314 may also use the images of the users within the environment to determine whether any of the users is the user identified in the audio command that requires user authorization. The user identification engine 314 may use facial recognition techniques to compare an image taken by the camera to an image stored in the user profile database 324 and associated with a user profile. In other examples, the voice-controlled device 300 may include pyroelectric infrared sensors, ultra-wideband range sensors, and other components that one of skill in the art in possession of the present disclosure would recognize would provide data to the user location engine 316 that may be used by the user location engine 316 to determine the user location in relation to the voice-controlled device 300.

Referring to the specific example illustrated in FIG. 5, the user device 510 may be configured to directly communicate with the first voice-controlled device 504, the second voice-controlled device 506, and the third voice-controlled device 508. The respective first wireless signal 512, second wireless signal 514, and third wireless signal 516 may each have a range of proximity at which the voice-controlled devices 504, 506, and 508 will establish a communication session with the user device 510 and receive the user device identifier. As illustrated, the user device 510 may be within range of each of the first wireless signal 512, the second wireless signal 514, and the third wireless signal 516, and each voice-controlled device 504, 506, and 508 may communicate a detection of the user device 510 to the other voice-controlled devices, a centralized device such as a service provider server 400, and/or the first voice-controlled devices 504 configured as a primary voice-controlled device. The voice-controlled devices 504, 506, and 508 may provide any detected user device identifiers to each other, and the voice-controlled device performing the location based voice recognition method may compare those user identifier(s) to user device identifiers associated with the user being authorized. For example, the first voice-controlled device 504 may receive an indication from the second voice-controlled device 506 and the third voice-controlled device 508 that each has detected the user device 510. The first voice-controlled device 504 may compare and match the user device identifier of user device 510 to a user identifier associated with a user profile of the user 502. The first voice-controlled device 504 may also determine that the user 502 is in the area defined by a union of the first wireless signal 512, the second wireless signal 514, and the third wireless signal 516 (e.g., the area where the first wireless signal 512, the second wireless signal 514, and the third wireless signal overlap coverage). In addition, the first voice-controlled device 504 may use signal strength, WiFi signal strength, a camera, and/or other user localization techniques described above to determine a more granular location of the user 502.

Referring now to FIG. 6 as an alternative specific example of FIG. 5, the environment 500 may include the user 602. The user 602 may be the user that needs to be authenticated based on the audio command provided by the user 502. In the specific example, the user 602 may be the 'UserA' of the audio command that is being provided by the user 502, and the first voice-controlled device 504 may determine the user location to be where the user 602 is located within the environment 500 (e.g., based on the user device identifier and wireless signals of the user device 510 that is associated with the user 602 and/or by any other user localization techniques described above).

The method 100 then proceeds to block 110 where a determination is made as to whether the source location correlates with the user location. In an embodiment of block 110, the voice-controlled device 300 may determine whether the source location determined by the audio source location engine 314 correlates with or satisfies a threshold of similarity with the user location determined by the user location engine 316. Because the audio command is likely provided by a user's voice, and the user location may be determined by a user's mobile device that may be at a different location than the provided audio signal such as on the user's wrist or in the user's pocket, the correlation between the user location and the source location may not be an exact location correspondence. Therefore, the user location may correlate with the source location if the user location and source location are within a predetermined distance of each other such as 1 in., 2 in., 6 in., 1 ft., 2 ft., 5 ft., 10 ft., 20 ft., and/or any other distance that one of skill in the art in possession of the present disclosure would recognize provides a sufficient correlation to ensure an audio command of a user was actually provided by that user. The predetermined distance may vary with the number of user detected at the location. For example, if there is only one user in the environment, then the predetermined distance for the source location and the user location to correlate may be greater than if there were ten people in the environment. In other examples, particular services being accessed by the audio command may require a minimum distance between the source location and user location before the service is accessed. For example, before making money transfers from a user's account, a payment service provider may require the user location and source location to be within 5 feet of each other. In other examples, factors such as historical use, a time of day, a day of week, a position of a face of the user talking, and other factors that may help establish common proximity patterns know to one of skill in the art in possession of the present disclosure may be used to correlate a source location with a user location.

Referring to the specific examples illustrated in FIG. 5 and FIG. 6, the first voice-controlled device 504 may determine that the user location of the user 502, which is the user being authenticated based on the user identified in the audio command, correlates with the source location of the audio command provided by the user 502. However, in FIG. 6, the first voice-controlled device 504 may determine that the user location of the user 602, who is the user being authenticated based on the user identified in the audio command, does not correlate with the source location of the audio command that is provided in the vicinity of the user 502 (who is not the user being authenticated in this example). If the source location correlates with the user location, then the method 100 may proceed at block 112. If the source location does not correlate with the user location and/or the user location is indeterminable because the user being authenticated is not detectable by the location based voice recognition system, then the method may continue at block 116.

If the source location correlates with the user location, the method 100 then proceeds to block 112 where voice authentication is performed based on the audio command. In an embodiment, the voice recognition engine 308 of the voice-controlled device 300 may perform voice authentication based on the audio command received from the user and/or subsequent audio commands/responses made when the user interacts with the voice-controlled device 300. When the audio command is requesting a service that is provided locally by the voice-controlled device 300, the voice recognition engine 308 may compare a voice print of the audio command to a stored voice print associated with a user profile in the user profile database 324 for the user identified by the audio command as the user being authenticated. The voice recognition engine 308 may include various voice authentication techniques to process a voice print, a voice template, and/or a voice model such as frequency estimation, Gaussian mixture models, pattern matching algorithms, neural networks, hidden Markov models, matrix representation, vector quantization, decision trees and/or other pattern recognition algorithms and voice authentication techniques known to one of skill in the art. In an embodiment, the voice recognition engine 308 may include an ontological parser that learns the user's voice and vocabulary over time to determine a voice print of the user.

Alternatively, the audio command may be requesting a service from a service provider device 400, and the voice-controlled device 300 may provide the audio command to the service provider device 400 for voice authentication (e.g., by comparing a voice print of the audio command to a stored voice print associated with a user profile for the user being authenticated as described above). In yet another example, the service provider device 400 may provide to the voice-controlled device 300 a voice print of the user identified in the audio command. The voice-controlled device 300 may receive the stored voice print from the service provider device 400 and perform the voice authentication according to one or more of the voice authentication techniques described above.

The method 100 then proceeds to block 114 where, in response to determining that the user location correlates with the source location and the voice authentication is successful (e.g., such that a comparison of the source location and the user location or comparison of a captured audio signal to a stored voice print satisfy a predetermined value), the services requiring both location correlation and voice authentication may be performed by the voice-controlled device 300 and/or the service provider device 400. However, if the voice authentication fails in block 112, then the voice-controlled device 300 and/or the service provider device 400 may provide more limited services that are only authorized if location correlation is successful.

Referring to the specific example in FIG. 5, the first voice-controlled device 504 may determine that location correlation and voice authentication are successful. As previously stated, the user 502 may have requested that the first voice-controlled device pay for an online purchase using a user account managed by a payment service provider. The payment service provider and/or the user associated with the user account may have established security features that require both location correlation and voice authorization before funds are transferred from the user's account, and when both location correlation and voice authentication are successful, the first voice-controlled device 504 and the service provider device of the payment service provider may perform the service requested in the audio command. However, if the location correlation is successful and the voice authentication is unsuccessful, then the first controlled-device 504 and/or the service provider device may not perform the service requested, or the first controlled-device 504 may indicate to the user other services that are permitted as a result of an only successful location correlation (e.g., providing an account balance of the user account).

Returning to decision block 110, if the source location does not correlate with the user location such that a location correlation fails, the method 100 may end and the voice-controlled device 300 may cancel the user authorization process. Alternatively, the method may proceed to block 116 where voice authentication may be performed. In an embodiment of block 116, the voice recognition engine 308 and/or a service provider device may perform the voice authentication as described at block 112. The method 100 then proceeds to block 118 where in response to the voice authentication being successful, the services based on voice authentication alone may be provided to the user in response to the audio command. If the voice authentication is unsuccessful then the user authorization fails and the method 100 may end with no service provisioning based on location correlation and voice authentication.

Referring to the specific example in FIG. 6 where the source location does not correlate with the user location, the first voice-controlled device 504 may return a notification to the user 502 that the user authorization process has failed. If a portion of the services requested by the user 502 requires only voice authentication and does not location correlation before the first voice-controlled device 504 and/or the service provider device perform the services requested, then as a result of a successful voice authentication, the first voice-controlled device 504 and/or the service provider device may perform the services. For example, the user 502 may request to access their payment service provider account to complete a transaction of an online purchase, which requires voice authentication and location correlation. However, the voice-controlled device 504, 506, and/or 508 may be unable to determine the user location even when the user associated with the payment service provider account is providing the audio command (e.g., because the user 502 may not have a user device 510 with the user and/or the first voice-controlled device 504 may not have a camera to perform facial recognition). In some embodiments, the payment service provider may allow the user to access other services of the user's payment service provider account through the voice-controlled device based on voice authentication such as, for example, obtaining an account balance, receiving a payment due date, changing personal information and/or other services that minimally affect the user if an unauthorized user has accessed the user's account by spoofing the user's voice.

Figure 7:
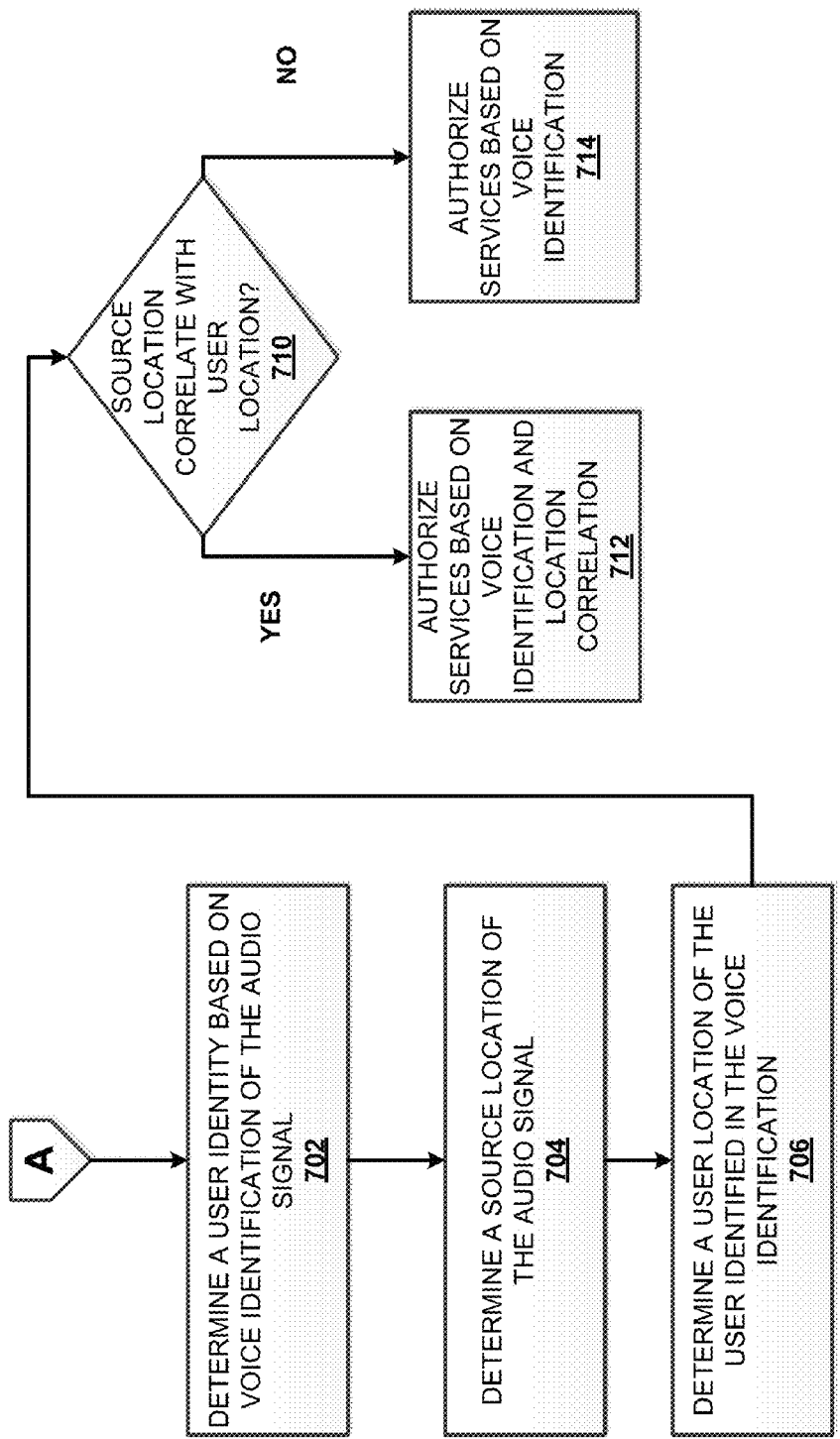
FIG. 7 is a flow chart illustrating an embodiment of a method for location based voice identification.

Returning to decision block 104, if the identity of the user is not included in the audio command for a request for a service that requires user authorization, the method 100 proceeds to method 700 in FIG. 7. Method 700 begins at block 702 where voice identification is performed based on the audio command. In an embodiment, at block 702, the voice recognition module 308 may perform the voice identification of the audio signal that includes the audio command such that a particular user is identified based on comparing the received voice print of the audio signal to a plurality of voice prints that are each associated with a particular user stored in a user profile database 320 and/or a user account database 408. Similar to the voice authentication described at blocks 112 and 114 above, the voice recognition engine 308 and/or the service provider device 400 may compare the voice print of the audio signal to a plurality of stored voice prints according to voice recognition techniques and pattern recognition algorithms described above. If a stored voice print correlates with the voice print of the audio command, the user associated with the stored voice print may be determined to be the user that provided the audio command.

The method 700 then proceeds to block 704 where the source location of the audio signal that includes the audio command is determined. In an embodiment of block 704, the audio source location engine 314 of the voice-controlled device 300 may determine the source location of the audio command. The audio source location engine 314 may determine the source location according to the same acoustic localization techniques described at block 106 of FIG. 1.

The method 700 then proceeds to block 706 where the user location of the user identified by the voice print of the audio command is determined. In an embodiment of block 706, the user location engine 316 of the voice-controlled device 300 may determine the user location of the user identified in the voice print of the audio command. The user location engine 316 may determine the user location according to any of the user localization techniques described above with reference to block 108 of FIG. 1. For example, the user identification engine 312 may compare user identifiers (e.g., a user device identifier stored in the user profile database and associated with a user profile of the user identified in the voice print of the audio signal) to user identifiers that the voice-controlled device 300 receives (e.g., user device identifiers that are detectable within the environment surrounding the voice-controlled device 300) and, if there is a match, the voice-controlled device 300 may determine the location of the captured user identifier in relation to the voice-controlled device 300. In an embodiment, the user location engine 316 and the user identification engine 312 may use the source location determined in block 704 to determine whether a user or users are present at the source location, and then determine the identity of that user or identities of the users at the source location.

The method 700 then proceeds to block 710 where location correlation is performed to determine whether the source location and the user location correlate. In an embodiment at block 710, the voice-controlled device 300 may determine whether the source location determined by the audio source location engine 314 correlates with or satisfies a threshold of similarity with the user location determined by the user location engine 316. Block 710 may perform any of the techniques described with respect to block 110 of FIG. 1 for determining whether the source location correlates with the user location. For example, the voice-controlled device 300 may correlate the source location and the user location based on a pre-defined tolerance such that the user location may correlate with the source location if the user location and source location are within a predetermined distance of each other such as 1 in., 2 in., 6 in., 1 ft., 2 ft., 5 ft., 10 ft., 20 ft., and/or any other distance that one of skill in the art in possession of the present disclosure would recognize provides a sufficient correlation to ensure an audio command of a user was actually provided by that user. The predetermined distance may vary with the number of user detected at the location. For example, if there is only one user in the environment, then the predetermined distance for the source location and the user location to correlate may be greater than if there were ten people in the environment. In other examples, services being requested may require a specific tolerance of the distance between the user location and the source location. In yet another example, the voice-controlled device 300 may compare one or more user identifiers of users located at the source location or in a threshold area in proximity to the source location to determine whether any of the users is the user identified by the voice identification of the audio signal. If none of the users is the user identified by the voice identification of the audio signal, then the source location and the user location do not correlate. If one of the users is the user identified by the voice identification of the audio command, then the source location correlates with the user location.

If the location correlation is successful at block 710, then the method proceeds to block 712 where services requested in the audio command are authorized and provided to the user providing the audio command. In an embodiment of block 712, the voice-controlled device 300 and/or the service provider device 400 may provide the services requested to the user providing the audio command. If the location correlation fails at block 710, then the method 700 proceeds to block 714 where services that require only voice identification are provided to the user providing the audio command. In an embodiment of block 714, the voice-controlled device 300 and/or the service provider device 400 may provide the services that do not require location correlation. Alternatively, the voice-controlled device 300 and/or the service provider device 400 may end the user authorization, provide a notification to the user that the user is not authorized to access the requested services, and the method 700 may end.

Figure 8:
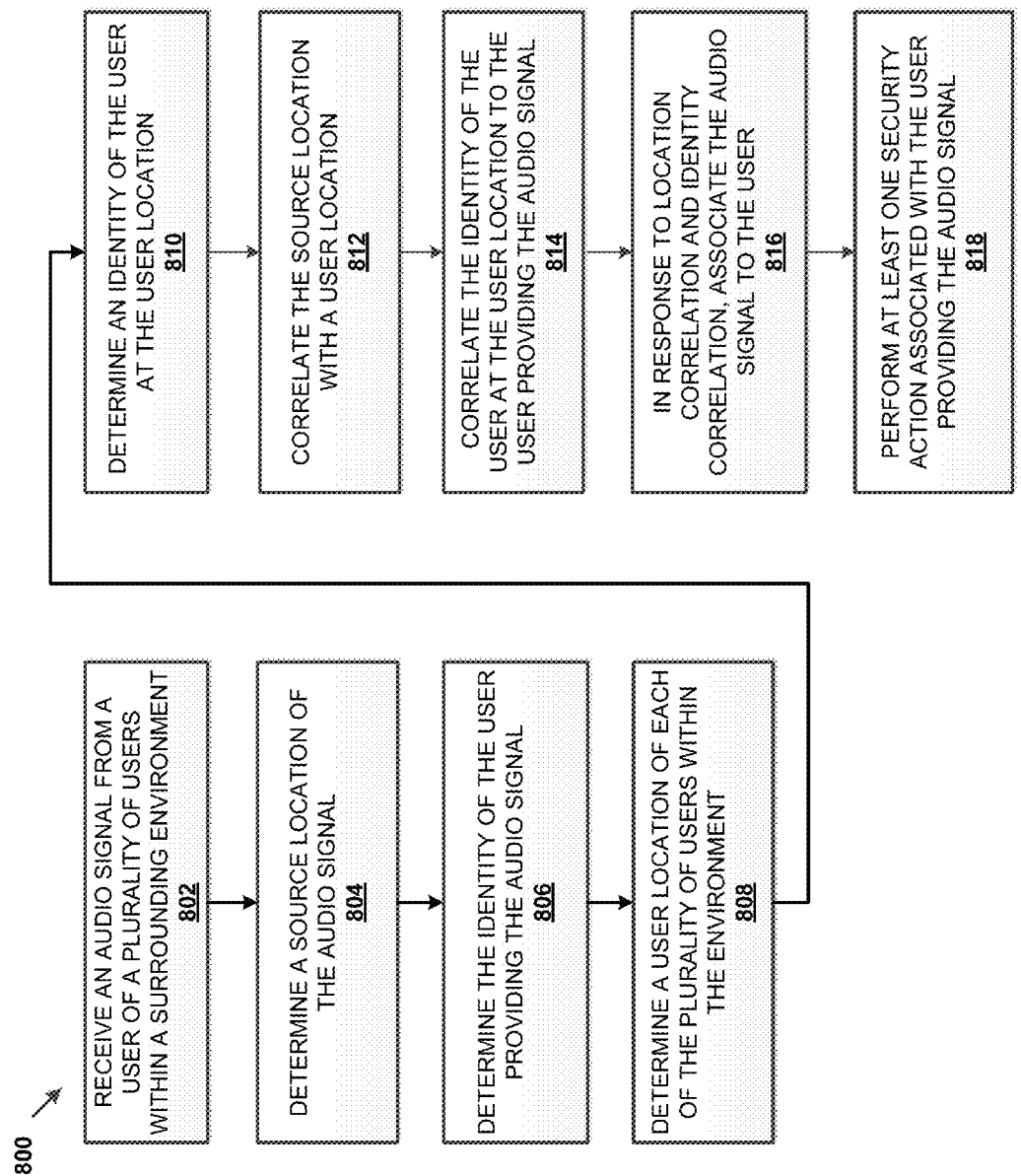
FIG. 8 is a flow chart illustrating an embodiment of a method for location based voice association.

Referring to FIG. 8, a method 800 of location based voice association begins at block 802 where a first audio signal from a user of a plurality of users within environment surrounding a microphone is received through the microphone. In an embodiment, the voice-controlled device may be the voice-controlled device 300 and at block 802 the voice-controlled device 300 may monitor the environment for audio signals. For instance, the microphone 326 of the voice-controlled device 300 may capture audio from the environment, the microphone 326 may generate electrical signals based on that audio signal, and those electrical signals may then be provided to the speech recognition engine 306. The speech recognition engine 306 is configured to determine what a user is saying by, in some examples, recognizing and translating spoken language into text or other data that may be processed by the processor. The speech recognition engine 306 may then analyze the electrical signals and further identify a user that is providing an audio command to the voice-controlled device 300. In an embodiment, the voice-controlled device 300 may receive audio signals from more than one user in the environment surrounding the voice-controlled device 300. In some situations, the speech recognition engine 306 may have trouble determining whether a first audio signal from a first user and a second audio signal from a second user are provided by the same user or different users. In other examples, instructions processed by the voice-controlled device 300 may require that the voice-controlled device 300 associate an audio signal received with a particular user. In other examples, when a first audio signal is received at the same time as a second audio signal, the speech recognition engine 306 may have difficulty processing what is being said due to multiple audio signals being received, and associating each audio signal with different processes such that the second audio signal does not affect the outcome of an audio command included in the first audio signal. Therefore, there is a need to separate multiple audio signals in an environment and associate each audio signal with its respective user.

Figure 9:
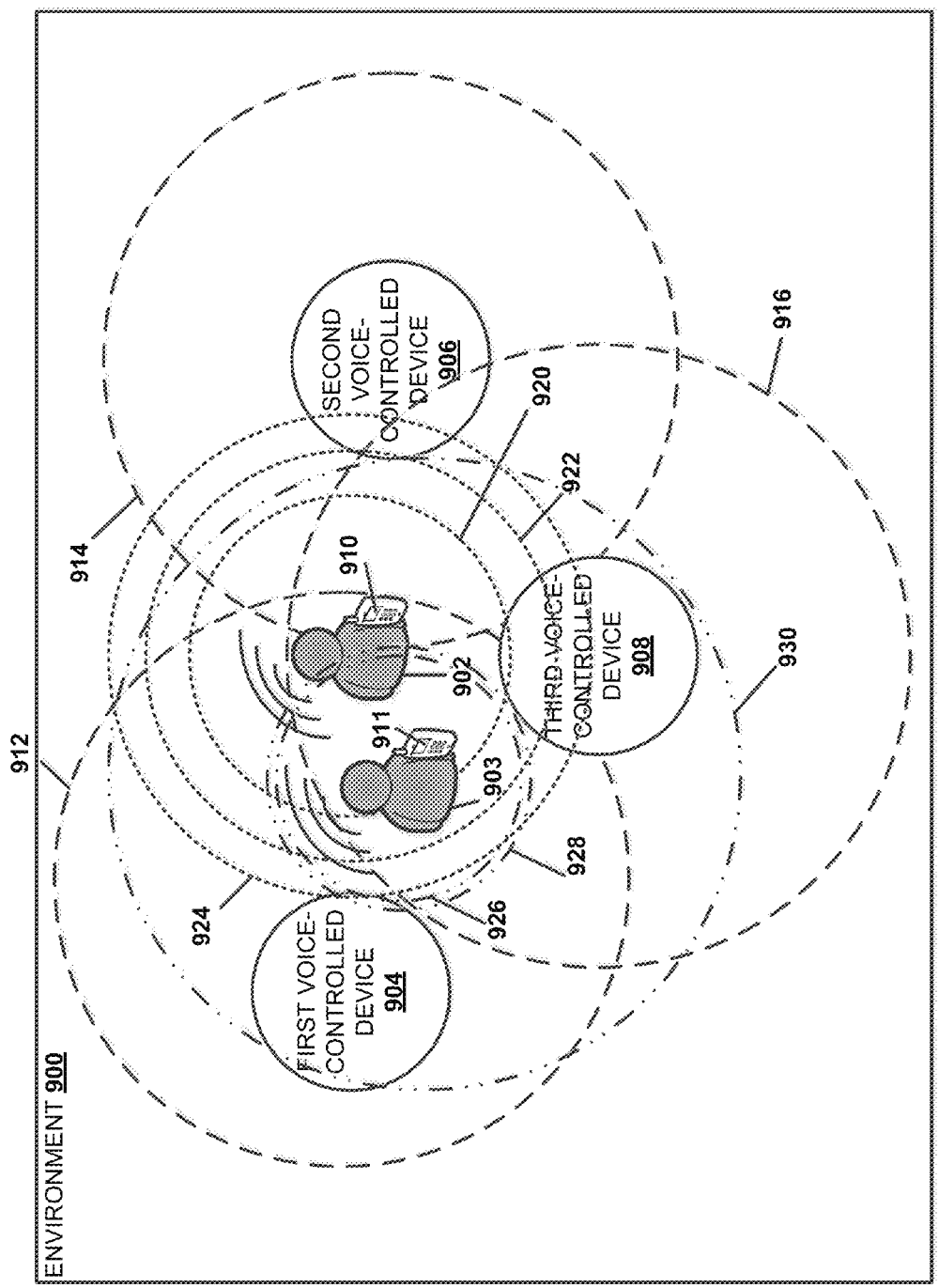
FIG. 9 is a block diagram illustrating an embodiment of a use of the location based voice association system of FIG. 2.

Referring now to FIG. 9, a block diagram of specific examples of the performance of the method 800 is illustrated. In FIG. 9, an environment 900 may include a first user 902 and a second user 903, as well as a first voice-controlled device 904 and optionally a second voice-controlled device 906 and a third voice-controlled device 908. The voice-controlled devices 904, 906, and 908 may be coupled together by a networking device (e.g., the networking device 210) providing a local area network (LAN) and/or the voice-controlled device 904, 906, and 908 may be coupled to each other through direct, peer-to-peer wireless connections. The networking device may provide a first wireless signal (e.g., Wi-Fi signal) (not illustrated) that generally provides a wireless local area network (WLAN) for the environment 900, and any of the first voice-controlled device 904, the second voice-controlled device 906, the third voice-controlled device 908 and any user devices (e.g., a first user device 910 and a second user device 911) may connect to the WLAN using techniques known in the art. The first voice-controlled device 904 may also provide a first wireless signal 912 via a wireless protocol such as Bluetooth®, BLE, NFC, IrDA, ANT, Zigbee, and other wireless protocols used for direct communication known in the art and the second voice-controlled device 906 may provide a second wireless signal 914 and the third voice-controlled device 908 may provide a third wireless signal 916 similar to any of those available to the first voice-controlled device 904. The first wireless signal 912, the second wireless signal 914, and the third wireless signal 916 may allow for direct communication between the first voice-controlled device 904, the second voice-controlled device 906, the third voice-controlled device 908, the first user device 910 and/or the second user device 911.

At block 802 of method 800 with reference to FIG. 9, the first voice-controlled device 904 and, optionally, the second voice-controlled device 906 and the third voice-controlled device 908, may monitor the environment 900 for audio signals provided by a user such as the first user 902 and the second user 903. The first user 902 may provide a first audio signal and the second user 903 may provide a second audio signal. One or more of the voice-controlled devices 904, 906, and 908 may receive the first audio signal and/or the second audio signal. In a specific example, the first user 902 and/or second user 903 may speak a predefined word or words, may make a predefined sound, or provide some other audible noise that, when recognized by the speech recognition engine 306, indicates to the speech recognition engine 306 that the user is going to provide an audio command to the voice-controlled device 300, followed by an audio command. In another example, the first user 902 and or the second user 903 may speak generating an audio signal that is generally not associated with an audio command that the voice-controlled device 300 receives and processes the speech. Similarly to the specific examples illustrated in FIG. 5 and FIG. 6, the speech recognition engine 306 may determine that the audio command includes an instruction for a voice-controlled device 300 to perform a service. The voice-controlled device 300 and/or a service provider device 400 may require user authorization before the service is provided to the user. For example, the first user 902 may request that the first voice-controlled device 904 instruct a payment service provider to pay for an on-line purchase using an account provided by the payment service provider device 400. The first voice-controlled device 904 may process the audio command and send a request to the payment service provider to complete the purchase. The payment service provider may require user authorization before the payment service provider will perform the service.

The method 800 then proceeds at block 804 where the voice-controlled device 300 determines a source location of the audio signal. In an embodiment of block 804, the audio source location engine 314 of the voice-controlled device 300 may determine the source location of the audio signal. If more than one audio signal is received, the audio source location engine 314 may determine a first source location of the first audio signal from the first user and a second source location of the second audio signal of the second user. The source location may include, for example, an actual location of the audio signal relative to the voice-controlled device 300, a distance between the source of the audio signal and the voice-controlled device 300, a direction of the source of the audio signal relative to the voice-controlled device 300, and/or any other measure of the audio command. The audio source location engine 314 of the voice-controlled device 300 may determine the source location of the audio signal according to any acoustic localization technique known in the art that can be performed by one or more voice-controlled devices 300. For example, the voice-controlled device 300 may include a plurality of microphones 326 that each generates an electrical signal based on an audio signal, and the audio source location engine 314 may utilize time-difference-of-arrival (TDOA) techniques to determine a distance between the source location of the audio signal and voice-controlled device 300. The audio source location engine 314 may then cross-correlate the times at which different microphones 326 received the audio signal to determine the source location of the audio signal.

Similarly, the voice-controlled device 300 may be the voice-controlled device 204 of FIG. 2, which may be in communication with the voice-controlled device 206 and/or the voice-controlled device 208. The voice-controlled devices 204, 206, and 208 may each include one or more microphones 326 that are positioned about an environment to receive audio signals from users. Each voice-controlled device 204, 206, and 208 may be synchronized such that when an audio signal is received by each voice-controlled device 204, 206, and 208, each voice-controlled device 204, 206, and 208 creates a time stamp that includes the time at which each voice-controlled device 204, 206, and 208 received the audio signal. The voice-controlled devices 204, 206, and 208 may communicate their respective time stamps and received audio signals to each other, to a primary voice-controlled device, the service provider device 400 and/or some other centralized device. At least one of the voice-controlled devices 204, 206, and 208 may use known positions of the voice-controlled devices 204, 206, and 208 along with the time stamps that indicate when each voice-controlled device 204, 206, and 208 received the audio signal to determine the source location of the audio signal based on TDOA and triangulation techniques. While specific examples of acoustic source localization have been describe, one of skill in the art in possession of the present disclosure will recognize that the voice-controlled device 300 may determine the source location of the audio signal using other acoustic localization methods without departing from the scope of the present disclosure.

Referring to the specific example illustrated in FIG. 9, the first user 902 provides a first audio signal in the environment 900. The third voice-controlled device 908 receives the first audio signal from the first user 902 at a first time 920, the second voice-controlled device 906 receives the first audio signal at a second time 922, and the first voice-controlled device 904 receives the first audio signal at a third time 924. Similarly, the second user 903 provides the second audio signal. In an example, the second user 903 may provide the second audio signal such that a portion, all, or none of the second audio signal is being provided while the first audio signal is being provided by the first user 902. The first voice-controlled device 904 receives the second audio signal at a fourth time 926, the third voice-controlled device 908 receives the second audio signal at a fifth time 928, and the second voice-controlled device 906 receives the second audio signal at a sixth time 930. Each of the first voice-controlled device 904, the second voice-controlled device 906, and the third voice-controlled device 908 may provide their respective audio signal time of arrivals to each other. In another example, the first voice-controlled device 904 may be a primary voice-controlled device while the second voice-controlled device 906 and the third voice-controlled device 908 may be secondary voice-controlled devices that provide back-up or redundancy to the system and provide any information gathered from the environment 900 to the first voice-controlled device 904. Based on the first time 920, the second time 922, and/or the third time 924, the first voice-controlled device 904 may use any acoustic source localization technique or combinations of techniques to determine the first source location of the first audio signal. Furthermore, based on the fourth time 926, the fifth time 928, and the sixth time 930 of the second audio signal the first voice-controlled device 904 may use any acoustic source localization technique or combination of techniques to determine the second source location of the second audio signal.

If at least a portion of the first audio signal and the second audio signal are provided at the same time, the audio source location engine 314 with the assistance of the speech recognition engine 304 may separate each audio signal because a composite audio signal of the first audio signal and the second audio signal received at each voice-controlled device 904, 906, and 908 may differ at each voice-controlled device 904, 906, and 908 due to the times at which each audio signal is received by each voice-controlled device 904, 906, and 908. Therefore, each voice-controlled device 904, 906, and 908 may provide their respective composite audio signals along with time stamps associated with the composite audio signal to each other. Based on the differences between the composite audio signals and the time stamps, the first voice-controlled device 904 (e.g., primary voice-controlled device) may separate each of the first audio signal and the second audio signal and determine a respective first source location and second source location.

The method 800 then proceeds to block 806 where an identity of a user based on the received audio signal is determined. In an embodiment of block 806, the voice recognition engine 308 may determine the identity of the user providing the audio signal by performing voice identification and/or voice authentication on the received audio signal to determine a user identity that is based on the audio signal. For example, a user may provide a claimed user identifier in the audio signal. The voice-controlled device 300 may associate the audio signal with the user associated with the user identifier. In another example, the voice-controlled device 300 may perform voice authentication to determine the user providing the claimed user identifier is in fact the user claimed by analyzing the voice print of the audio signal. In another example, when there is no user identifier indicated in the audio signal, the voice-controlled device 300 may perform voice identification by comparing a voice print of the audio signal to stored voice prints associated with known users according to voice identification techniques described above.

Referring to the specific example illustrated in FIG. 9, the first voice-controlled device 904, the second voice-controlled device 906, the third voice-controlled device 908, and/or the service provider device 400 may determine a first identifier based on the first audio signal provided by the first user 902 and a second identifier based on the second audio signal provided by the second user 903. In an example, the first identifier may be a user identifier associated with the first user and the second identifier may be a user identifier associated with the second user. In another example, the first identifier may be associated with a third user if the first user is providing a recorded or synthesized voice to the voice-controlled devices 904, 906, and 908.

The method 800 then proceeds to block 808 where a user location of the user providing the audio signal is determined. In an embodiment of block 808, the user location engine 316 of the voice-controlled device 300 may determine a user location of each user within the environment surrounding of the voice-controlled device 300. The user location may include, for example, an actual location of the user relative to the voice-controlled device 300, a distance between the user and the voice-controlled device 300, and/or a direction of the user relative to the voice-controlled device 300. The user location engine 316 of the voice-controlled device 300 may determine the user location of the user providing the audio command according to any user localization technique known in the art that can be performed by one or more voice-controlled devices 300.

For example, the user location engine 316 may receive signal strengths of one or more wireless protocols of a user device (e.g., the user device 214 of FIG. 2) that is in the environment. The user location engine 316 may receive a signal strength that is associated with a user device identifier of the user device 214 from the communication engine 318 and associate each user device identifier as a user within the environment. For example, the user device 214 may communicate with one or more networking devices 210 via Wi-Fi. The one or more networking devices 210 may each be configured to communicate a signal strength and a user device identifier of the user device 214 to the communication engine 318 via the first communication interface 320. Alternatively or in addition to the Wi-Fi signal, the second communication interface 322 of the voice-controlled device 300 may be in direct communication with the user device 214 with a direct communication protocol such as BLE. The communication engine 318 may be configured to determine signal strength of the direct communication protocol as well as provide a user device identifier associated with the user device communicating with the communication engine. The voice-controlled device 300 may also receive signal strength information and user device identifier information from other voice-controlled devices 300 that are included in a network. The user location engine 316 may determine the location of the user device providing the wireless signals by any wireless signal localization techniques, such as Wi-Fi based positioning, Bluetooth® proximity based detection, angle of arrival techniques, time of arrival techniques, received signal strength indication (RSSI) measurements and other wireless signal localization. In other embodiments, the user device 214 may be configured to provide GPS information associated with the user device 214 to the voice-controlled device 300.

In another example, the identity detection device 330 of the voice-controlled device 300 may include a camera that is configured to capture images of the environment and the user location engine 316 may analyze these images to identify a location of one or more users within the environment, distances of users in the environment from the voice-controlled device 300, and/or directions of users relative to the voice-controlled device 300. In other examples, the voice-controlled device 300 may include pyroelectric infra-red sensors, ultra-wideband rage sensors, and other components known to one of skill in the art in possession of the present disclosure that may provide data to the user location engine 316 such that the data may be used by the user location engine 316 to determine the user location in relation to the voice-controlled device 300.

The method 800 may also proceed to block 810 where an identity of the user at the user location is determined. In an embodiment of block 810, the user location engine 316 in conjunction with the user identification engine 312 may determine that the user device identifier associated with the received signals is a user device identifier of a user device that is associated with a user profile in the user profile database 324. The user identification engine 314 may also use the images of the users within the environment to determine the identity of the users in the environment. The user identification engine 314 may use facial recognition techniques to compare an image taken by the camera to an image stored in the user profile database 324. While specific examples of user identification are discussed, one of skill in the art in possession of the present disclosure will recognize that other user identification techniques based on a user's physical location may be used to determine the identity of users within an environment surrounding the voice controlled device 300.

Referring to the specific example illustrated in FIG. 9, the first user device 910 and second user device 911 may be configured to directly communicate with the first voice-controlled device 904, the second voice-controlled device 906, and the third voice-controlled device 908. The respective first wireless signal 912, the second wireless signal 914, and the third wireless signal 916 may each have a range of proximity at which the voice-controlled devices 904, 906, and 908 may establish a communication session with the first user device 910 and second user device 911. As illustrated, the first user device 910 may be within range of each of the first wireless signal 912, the second wireless signal 914, and the third wireless signal 916. While the second user device 911 may be within range of the first wireless signal 912 and the third wireless signal 916. Each voice-controlled device 904, 906, and 908 may communicate a detection of the first user device 910 to the other voice-controlled devices, a centralized device such as a service provider server 400, and/or the first voice-controlled devices 504 configured as a primary voice-controlled device. Likewise, the first voice-controlled device 904 and third voice-controlled device 908 may communicate a detection of the second user device 911. The voice-controlled devices 904, 906, and 908 may provide any detected user device identifiers to each other, which the voice-controlled device and/or service provider device performing the method 800 may use to compare the user device identifiers received to user device identifiers stored in the user profile database 324.

For example, the first voice-controlled device 904 may receive an indication from the second voice-controlled device 906 and the third voice-controlled device 908 that each has detected the first user device 910 by including a user device identifier of first user device 910. The first voice-controlled device 904 may receive an indication from the third voice-controlled device 908 that the third voice-controlled device 908 has detected the second user device 911. The first voice-controlled device 904 may compare and match the user device identifier of first user device 910 to a user identifier associated with the user profile of the first user 902 and compare and match the user device identifier of the second user device 911 to a user identifier associated with the user profile of the second user 903. The first voice-controlled device 904 may also determine that first user 902 is in the area defined by the union of the first wireless signal 912, the second wireless signal 914, and the third wireless signal 916. Similarly, the first voice-controlled device 904 may determine that the second user 903 is in the area defined by the union of the first wireless signal 912 and the third wireless signal 916. In addition, the first voice-controlled device 504 may use signal strength, WiFi signal strength, a camera, and/or other user localization techniques described above to determine a more granular location and identity of the first user 902 and the second user 903.

The method 800 then proceeds to block 812 where the source locations are correlated with the user locations. In an embodiment of block 812, the voice-controlled device 300 may determine whether the source location determined by the audio source location engine 314 correlates with or satisfies a threshold of similarity with any of the user locations determine by the user location engine 316. Because the audio command is likely provided by a user's voice and the user location may be determined by a user's mobile device, which may be at another location such as on the user's wrist or in the user's pocket, the correlation between the user location and the source location may not be precise. Therefore, the user location may correlate with the source location if the user location and source location are within 1 in., 2 in., 6 in., 1 ft., 2 ft., 5 ft., 10 ft., 20 ft., and/or any other distance that one of skill in the art in possession of the present disclosure would recognize provides a sufficient correlation to ensure an audio command of a user was actually provided by that user. When there is a plurality of user locations determined, the user location that is closest to the source location may be correlated with the source location.

Referring to the specific example illustrated in FIG. 9, the first voice-controlled device 904 may determine that the user location of the first user 902 correlates with the source location of the first audio signal provided by the first user 902. Additionally, the first voice-controlled device 904 may determine that the user location of the second user 903 correlates with the source location of the second audio signal.

The method 800 then may proceed to block 814 where the identity of the user at the user location is correlated to the identity of the user identified from the audio signal. In an embodiment of block 814, the voice-controlled device 300 may optionally correlate the identity of the user at the user location correlated with the source location to the identity of the user identified from the audio signal. Block 814 may provide additional user authorization for audio signals that include audio commands that require user authorization by determining a user identity based on a voice print of an audio signal and a user identity of the user at the same location as the source of the audio signal. If the user identities of the correlated source location and user location match, then there is a higher probability that the user providing the audio signal is the actual user identified from the audio signal than relying on the user identified from the audio signal alone.

The method 800 then proceeds to block 816 where in response to the location correlation, the audio signal may be associated with the user located at the at the source location of the audio signal. In an embodiment of block 816, the voice association engine 317 of the voice-controlled device 300 may associate the audio signal with the user located at the source location of the audio signal. In an embodiment, the voice association engine 317 may only associate an audio signal with the user if the user's identity is correlated with the identity the voice-controlled device identified from the audio signal as well as location correlation. Referring to the specific example illustrated in FIG. 9, the first voice-controlled device 904, the second voice-controlled device 906, and/or the third voice-controlled device 908 based on the location correlation and optionally identity correlation, the first audio signal with the first user 902 and the second audio signal with the second user 903. For any subsequent audio signals produced by the first user 902 and the second user 903, location correlation may be performed again to associate a subsequent audio signal to one of the first user 902 or second user 903, which may then be associated back to the first or second audio signal thereby allowing the voice-controlled devices 904, 906, and 908 to track what is being said by the user 902 and 903 over time.

The method 800 then proceeds to block 818 where at least one security action associated with the user providing the audio signal is performed. In an embodiment of block 818, the voice-controlled device 300 and/or the service provider device 400 may provide a security action associated with the audio signal such as voice-recognition, user authorization, a customized user experience based on the user, and/or any other security action one of skill in the art in possession of the present disclosure would recognize. Therefore, using location correlation to associate an audio signal with a user may assist the voice-controlled device 300 in determining which user is providing which audio signal in an environment of a plurality of users. For example, if the voice-controlled device 300 cannot distinguish between two users speaking at the same time or the voice-controlled device cannot determine whether an audio signal and a subsequent audio signal are from the same user, correlation of the source location and the user location may provide a higher degree of probability of who and/or where the audio signal is originating from. Although determining source location alone may provide more certainty in associating audio signals with a particular individual, situations may arise where two users are close enough together that the voice-controlled device 300 cannot reliably associate an audio signal with a user based on the source location of the audio signal and therefore, determination of user location by the voice-controlled device can provide a higher degree of certainty as to which user is providing which audio signal.

In another use example, the first user may provide a first audio signal at a first time at a first location and then change locations and provide a second audio signal at a second time at a second location. If source location were used alone to associate the first audio signal and second audio signal with the first user, the voice-controlled device 300 would have to be able to determine that the voice prints of the first audio signal and the second audio signal are from the first user, especially if the first user moves locations. However, if the source location of the first audio signal is correlated with a user location that is associated with a user identifier of the first user providing the first audio signal, and the first user subsequently moves to a second location within the environment, the first user provides the second audio signal, and the voice-controlled device 300 determines the same user identifier is present at the second location, then the voice-controlled device 300 may determine with more certainty that the second audio signal is provided by the first user. Although specific use based examples of location based voice association are described, those of skill in the art will recognize other uses where correlating a source location of an audio signal with a user location of a user may be beneficial in tracking and associating audio signals to users in a particular environment.

In yet another example, the first user may be in environment with a plurality of voice-controlled devices 300. The user may provide an audio command for one voice-controlled device to perform a service. If the user does not include an identifier of which voice-controlled device that the user is requesting services, the plurality of voice controlled devices may determine a user location of the user and a source location of the audio command. The voice-controlled devices may determine a directional vector of the audio command such that the voice-controlled device may determine the direction the user is facing. Based on the directional vector of the audio command and location of the user, the plurality of voice-controlled devices may determine which of the plurality of voice-controlled devices the user is providing an audio command and that voice-controlled device will provide the requested service.

Thus, systems and methods have been described that provide for a location based voice recognition system and a location based voice association system. The location based voice recognition system and methods provide for additional security measures when a user is accessing a service requiring user authorization based on voice recognition. Correlating a user's physical location to the source location of an audio signal that includes an audio command requesting a secure service prevents unauthorized users from gaining access to the secure service by providing a recorded or synthesized voice of an authorized user. As such, voice-controlled devices such as smart speakers, appliances, and other home automated voice-controlled devices may be used to facilitate more security sensitive services to end users. Likewise, the location based voice association system and methods provide voice-controlled devices with a better determination of what is being said in an audio signal, who is providing the audio signal, separation of simultaneous audio signals, and tracking sequential audio signals from the same user in an environment where there are a plurality of users of the location based voice association system. Correlating a source location of an audio signal to a user location may be used to associate a received audio signal with a particular user, which may be used to accomplish the previously described advantages of location based voice association system. Therefore, voice-controlled devices may be used to facilitate services in more public settings where multiple users are present.

Figure 10:
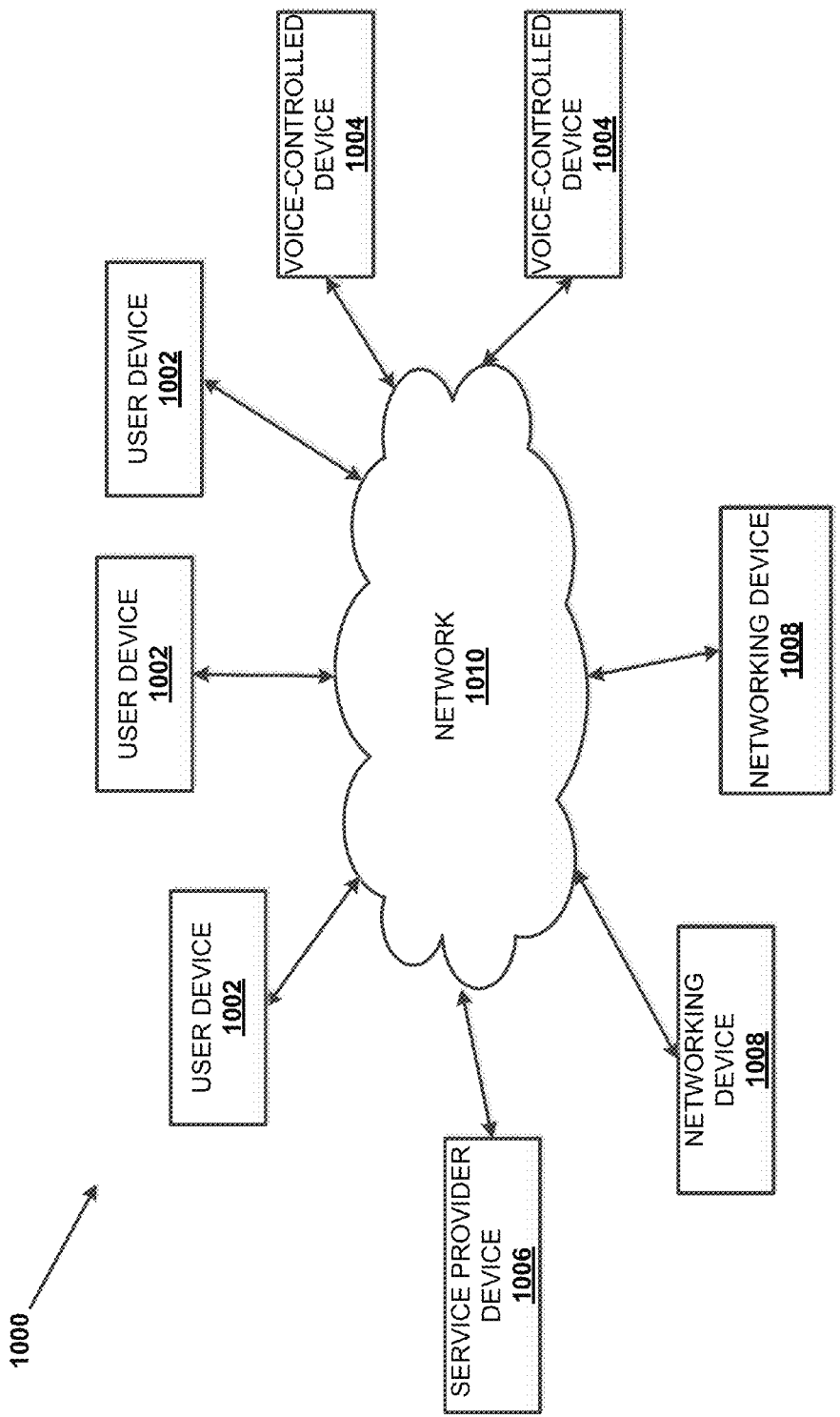
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of user devices 1002, a plurality of voice-controlled devices 1004, a messaging service provider device 1006, and a plurality of networking devices 1008 in communication over a network 1010. Any of the user devices 1002 may be any of the user devices discussed above and operated by the users discussed above. The voice-controlled devices 1004 may be the voice-controlled devices discussed above and may be operated by the users discussed above. The service provider device 1006 may be the messaging service provider device 400 discussed above and may be operated by a payment service provider such as, for example, PayPal Inc. of San Jose, Calif. The networking devices 1008 may be the networking devices discussed above and may be operated by the users and/or network administrators.

The user devices 1002, the voice-controlled devices 1004, the service provider device 1006, and the networking devices 1008 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In other embodiments, the user device 1002 may be a smart phone, personal digital assistant (PDA), laptop computer, and/or other types of computing devices.

The user device 1002 may include one or more browser applications which may be used, for example, to provide a convenient interface to permit the user to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the user. In one embodiment, the toolbar application may display a user interface in connection with the browser application.

The user device 1002 may further include other applications as may be desired in particular embodiments to provide desired features to the user device 1002. In particular, the other applications may include a payment application for payments assisted by a payment service provider through the service provider device 1006. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the voice-controlled devices 1004, the service provider device 1006 and/or the networking devices 1008 to associate the user with a particular user profile as further described herein.

Figure 11:
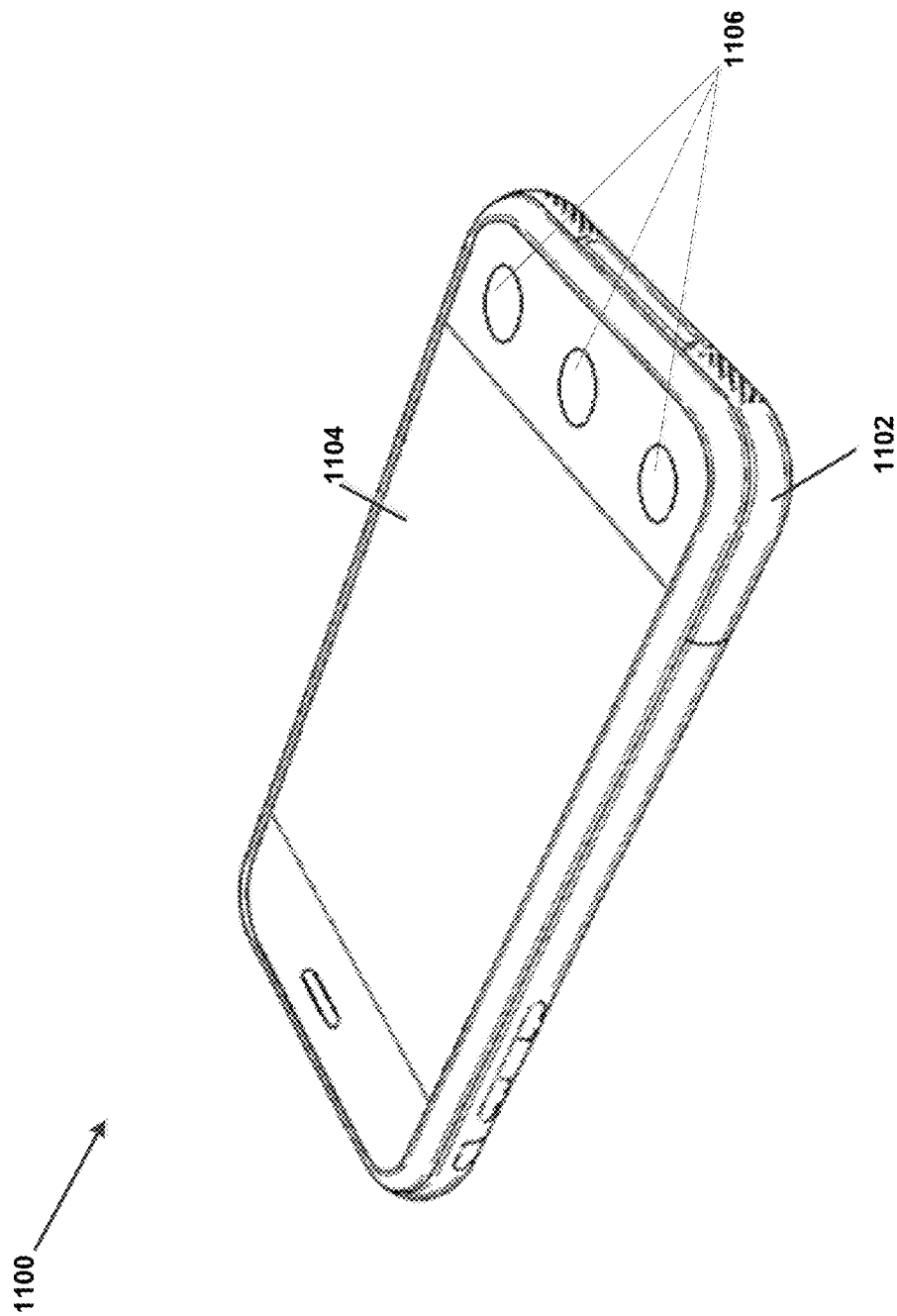
FIG. 11 is a perspective view illustrating an embodiment of a user device.

Referring now to FIG. 11, an embodiment of a user device 1100 is illustrated. The user device 1100 may be the user devices 214, 510, 520, 910, and/or 911. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 12:
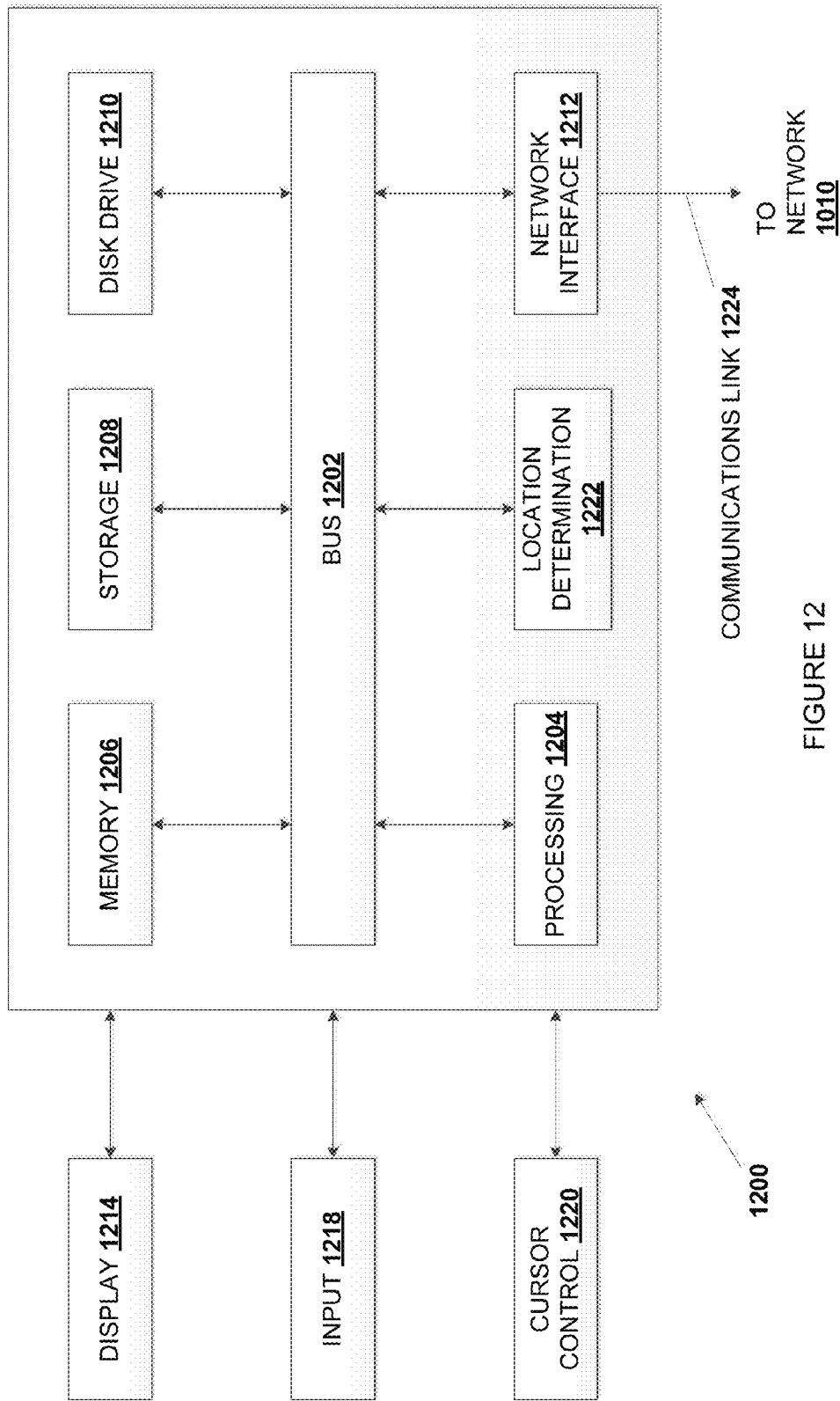
FIG. 12 is a schematic view illustrating an embodiment of a computer system.

Referring now to FIG. 12, an embodiment of a computer system 900 suitable for implementing, for example, the user devices 214, 510, 520, 910, 911, and/or 1002, the voice-controlled devices 204, 206, 208, 300, 504, 506, 508, 904, 906, 908, and/or 1004, the service provider device 216, 400, and/or 1006, and/or the networking devices 210 and/or 1008, is illustrated. It should be appreciated that other devices utilized by users, and service providers in the audio communication system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and/or a location determination component 1222 (e.g., a Global Positioning System (GPS) device as illustrated, a cell tower triangulation device, and/or a variety of other location determination devices known in the art.) In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the user devices, the voice-controlled device(s), the messaging service provider device, and/or the networking device(s). Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
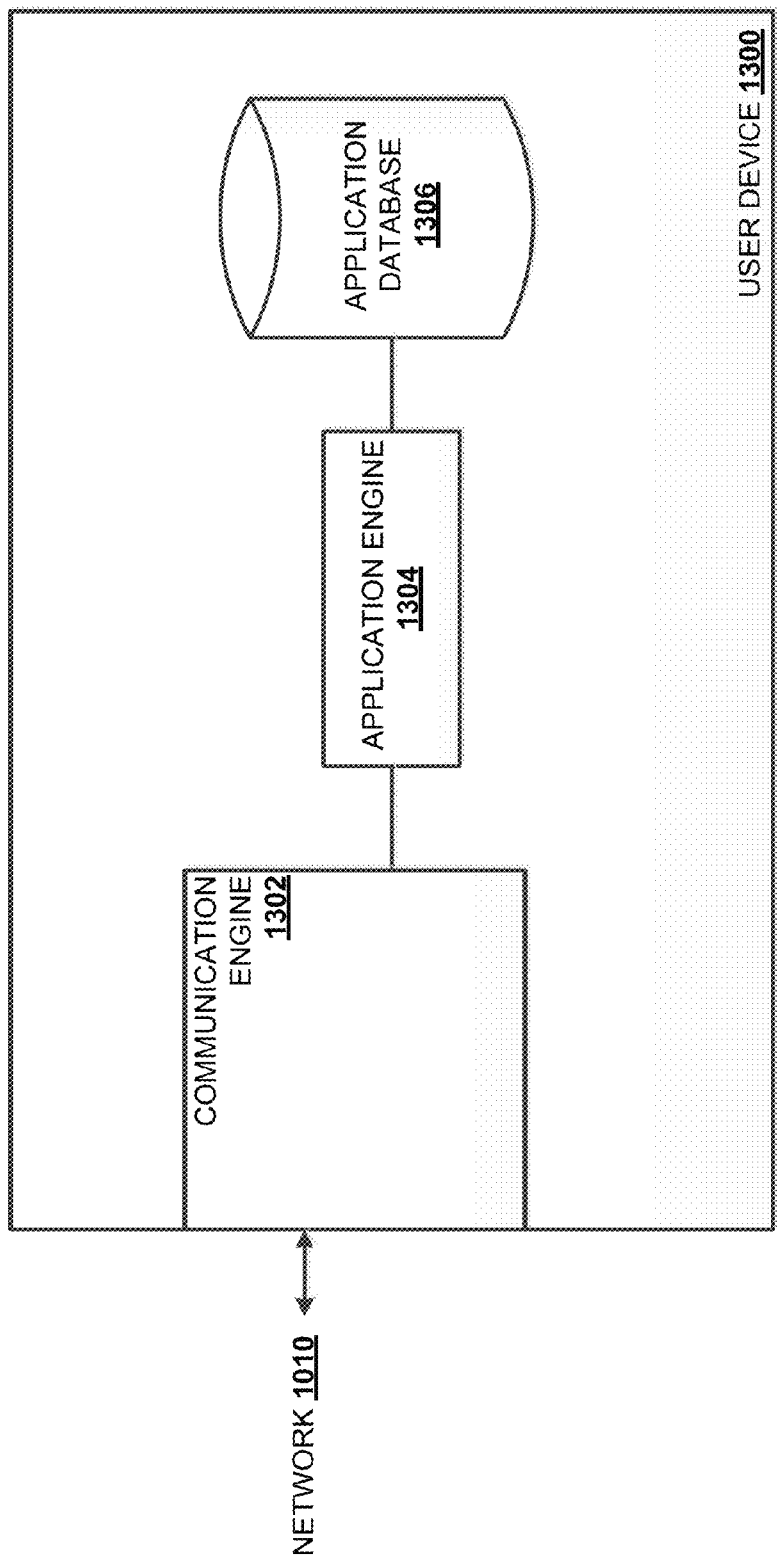
FIG. 13 is a schematic view illustrating an embodiment of a user device.

Referring now to FIG. 13, an embodiment of a user device 1300 is illustrated. In an embodiment, the user device 1300 may be the user devices 214, 510, 520, 910, 911, and/or 1002. The device 1300 includes a communication engine 1302 that is coupled to the network 710 and to an application engine 1304 that is coupled to an application database 1306. The communication engine 1302 may be software or instructions stored on a computer-readable medium that allows the device 1300 to send and receive information over the network 1010 and/or to other user devices, networking devices, and/or voice-controlled device directly through a low energy communication protocol. The application engine 1304 may be software or instructions stored on a computer-readable medium that is operable to receive audio messages and audio commands and provide any of the other functionality that is discussed above. While the database 1306 has been illustrated as located in the user device 1300, one of skill in the art will recognize that it may be connected to the application engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users providing messages to other users; however, a user or consumer can interact with any type of recipient, including charities and merchants by providing payments through the voice-controlled audio communication system. The payment does not have to involve a purchase, but may be a loan, a charitable contribution, a gift, etc. Thus, users as used herein can also include charities, individuals, and any other entity or person receiving a payment from another user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A voice recognition system, comprising:
a first microphone configured to capture an audio signal from an environment surrounding the first microphone and convert the audio signal into an electrical signal;
a non-transitory memory; and
one or more hardware processors coupled to the non-transitory memory and the first microphone, wherein the one or more hardware processors are configured to execute instructions from the non-transitory memory to cause the system to perform operations comprising:
receiving, via the first microphone, an audio signal from a first user that includes an audio command requesting a service that requires user authorization before access to at least a portion of the service is granted;
determining a source location of the audio signal based on time of arrival of the audio signal at the first microphone and information corresponding to the audio command received at one or more second microphones;
determining a user location of the first user based on a location of a user device associated with the first user;
determining whether the source location of the audio signal correlates with the user location such that the source location and the user location are within a predetermined distance of each other;
performing, in response to determining the source location correlates with the user location, voice recognition on the audio signal; and
authorizing, based on the voice recognition performed on the audio signal, the first user to access the service.

2. The system of claim 1, wherein the operations further comprise determining that the voice recognition satisfies a threshold value of similarity and, in response, authorizing access to features of the service requested in the audio command that require voice recognition and location correlation of the source location and the user location.

3. The system of claim 1, wherein the operations further comprise determining that the source location of the audio signal does not correlate with the user location, and in response, cancelling user authorization.

4. The system of claim 1, wherein the operations further comprise:
determining that the source location of the audio signal does not correlate with the user location, and in response, performing voice recognition based on the audio signal; and
authorizing access to a first set of features of the service that require voice recognition based on the audio signal and that would otherwise not be accessible without voice recognition or deny access to a second set of features that require the source location to correlate with the user location and the voice recognition.

5. A method for location based voice recognition, comprising:
receiving, by a voice controlled system via a first microphone, an audio signal from a first user that includes an audio command requesting a service that requires user authorization before access to at least a portion of the service is granted;
determining, by the voice controlled system, a source location of the audio signal based on time of arrival of the audio signal at the first microphone and information corresponding to the audio command received at one or more second microphones;
determining, by the voice controlled system, a user location of the first user based on a location of a user device associated with the first user;
determining, by the voice controlled system, whether the source location of the audio signal correlates with the user location such that the source location and the user location are within a predetermined distance of each other;
performing, by the voice controlled system in response to determining the source location correlates with the user location, voice recognition on the audio signal; and
authorizing, by the voice controlled system, based on the voice recognition performed on the audio signal, the first user to access the service.

6. The method of claim 5, further comprising determining, by the voice controlled system, that the voice recognition satisfies a threshold value of similarity and, in response, authorizing access to features of the service requested in the audio command that require voice recognition and location correlation of the source location and the user location.

7. The method of claim 5, further comprising determining, by the voice controlled system, that the source location of the audio signal does not correlate with the user location, and in response, cancelling user authorization.

8. The method of claim 5, further comprising:
determining, by the voice controlled system, that the source location of the audio signal does not correlate with the user location, and in response, performing voice recognition based on the audio signal; and
authorizing, by the voice controlled system, access to a first set of features of the service that require voice recognition based on the audio signal and that would otherwise not be accessible without voice recognition or deny access to a second set of features that require the source location to correlate with the user location and the voice recognition.

9. A non-transitory machine-readable medium having stored thereon machine-readable instructions executable to cause a machine to perform operations comprising:
receiving, via a first microphone, an audio signal from a first user that includes an audio command requesting a service that requires user authorization before access to at least a portion of the service is granted;
determining a source location of the audio signal based on time of arrival of the audio signal at the first microphone and information corresponding to the audio command received at one or more second microphones;
determining a user location of the first user based on a location of a user device associated with the first user;
determining whether the source location of the audio signal correlates with the user location such that the source location and the user location are within a predetermined distance of each other;

performing, in response to determining the source location correlates with the user location, voice recognition on the audio signal; and authorizing, based on the voice recognition performed on the audio signal, the first user to access the service.

10. The non-transitory machine-readable medium of claim 9, wherein the operations further comprise determining that the voice recognition satisfies a threshold value of similarity and, in response, authorizing access to features of the service requested in the audio command that require voice recognition and location correlation of the source location and the user location.

11. The non-transitory machine-readable medium of claim 9, wherein the operations further comprise determining that the source location of the audio signal does not correlate with the user location, and in response, cancelling user authorization.

12. The non-transitory machine-readable medium of claim 9, wherein the operations further comprise:

determining that the source location of the audio signal does not correlate with the user location, and in response, performing voice recognition based on the audio signal; and authorizing access to a first set of features of the service that require voice recognition based on the audio signal and that would otherwise not be accessible without voice recognition or deny access to a second set of features that require the source location to correlate with the user location and the voice recognition.

13. The system of claim 1, wherein the determining the user location of the first user includes determining the user location based on data captured by an identity detection device coupled to the one or more hardware processors.

14. The method of claim 5, wherein the determining the user location of the first user includes determining the user location based on data captured by an identity detection device coupled to the voice controlled system.

15. The non-transitory machine-readable medium of claim 9, wherein the determining the user location of the first user includes determining the user location based on a location of a user device associated with the first user.

* * * * *